US008999877B2

(12) United States Patent
Kamiya et al.

(10) Patent No.: US 8,999,877 B2

(45) Date of Patent: Apr. 7, 2015

(54) SINGLE-CRYSTAL FINE POWDER OF SULFIDE OR SULFIDE COMPLEX AND METHOD FOR PREPARING THE SAME

(75) Inventors: Sumio Kamiya, Toyota (JP); Tatsuo Shou, Okazaki (JP); Yukinobu Kato, Toki (JP); Noboru Otake, Toyota (JP); Kazumichi Yanagisawa, Kochi (JP); Wuxing Zhang, Kochi (JP)

(73) Assignees: Toyota Jidosha Kabushiki Kaisha, Toyota-shi, Aichi (JP); National University Corporation Kochi University, Kochi-shi, Kochi (JP)

(*) Notice: Subject to any disclaimer, the term of this patent is extended or adjusted under 35 U.S.C. 154(b) by 777 days.

(21) Appl. No.: 12/677,595

(22) PCT Filed: Sep. 12, 2008

(86) PCT No.: PCT/JP2008/066938
§ 371 (c)(1), (2), (4) Date: Aug. 17, 2010

(87) PCT Pub. No.: WO2009/035164
PCT Pub. Date: Mar. 19, 2009

(65) Prior Publication Data

US 2010/0316559 A1 Dec. 16, 2010

(30) Foreign Application Priority Data

Sep. 14, 2007 (JP) ................................ 2007-239840

(51) Int. Cl.
*B01J 27/02* (2006.01)
*C01G 3/10* (2006.01)
(Continued)

(52) U.S. Cl.
CPC ................ *C01G 39/02* (2013.01); *C01G 47/00* (2013.01); *C01G 55/00* (2013.01);
(Continued)

(58) Field of Classification Search
None
See application file for complete search history.

(56) References Cited

U.S. PATENT DOCUMENTS 4,308,171 A 12/1981 Dines et al.
4,596,785 A * 6/1986 Toulhoat et al. .............. 502/220
(Continued)

FOREIGN PATENT DOCUMENTS

CA 1 137 275 12/1982
DE 38 02 236 A1 8/1989
(Continued)

OTHER PUBLICATIONS

Berntsen, N. et al., "A Solvothermal Route to High-Surface-Area Nanostructured $MoS_2$," Chem. Mater. 2003, vol. 15, pp. 4498-4502.
(Continued)

*Primary Examiner* — Melvin C. Mayes
*Assistant Examiner* — Sheng H Davis
(74) *Attorney, Agent, or Firm* — Finnegan, Henderson, Farabow, Garrett & Dunner, LLP

(57) ABSTRACT

This invention provides a fine particle composite comprising fine powder of a sulfide or sulfide complex comprising a given element. The fine particle composite is obtained by a method for producing a fine particle composite comprising fine powder of a sulfide or sulfide complex comprising at least one element selected from the group consisting of molybdenum (Mo), rhodium (Rh), ruthenium (Ru), and rhenium (Re). Such method comprises steps of: preparing a solvent mixture from at least one compound containing an element selected from among molybdenum (Mo), rhodium (Rh), ruthenium (Ru), rhenium (Re), and sulfur (S); and subjecting the solvent mixture to a hydrothermal or solvothermal reaction. The resulting fine particle composite comprises fine particles of a sulfide or sulfide complex comprising at least one element selected from the group consisting of molybdenum (Mo), rhodium (Rh), ruthenium (Ru), and rhenium (Re).

1 Claim, 50 Drawing Sheets

Introduction of starting materials (Mo, Ru, Rh, Re, and S) into autoclave
Types and quantitative ratios of starting materials
↓
Introduction of solvent into autoclave
Type and amount of solvent
↓
Hydrothermal reaction
Solvothermal reaction
↓
Washing, recovery via centrifugation, and drying in vacuo of solid product
↓
Presintering in Ar atmosphere
Temperature, duration
↓
Evaluation of performance
SEM, HRTEM, EDX, FTIR, XRD

(51) Int. Cl.

| | |
|---|---|
| ***C01G 3/12*** | (2006.01) |
| ***B01D 11/00*** | (2006.01) |
| ***C01G 39/02*** | (2006.01) |
| ***C01G 47/00*** | (2006.01) |
| ***C01G 55/00*** | (2006.01) |

(52) U.S. Cl.

CPC ........ *C01P 2002/72* (2013.01); *C01P 2002/82* (2013.01); *C01P 2002/85* (2013.01); *C01P 2004/03* (2013.01); *C01P 2004/04* (2013.01)

(56) References Cited

U.S. PATENT DOCUMENTS

| | | | | |
|---|---|---|---|---|
| 2002/0035305 | A1 * | 3/2002 | Ichikawa et al. .............. | 585/700 |
| 2004/0262577 | A1 | 12/2004 | Urabe et al. | |

FOREIGN PATENT DOCUMENTS

| | | |
|---|---|---|
| EP | 1 199 280 A1 | 4/2002 |
| FR | 2 391 155 | 12/1978 |
| JP | 53-142397 | 12/1978 |
| JP | 2004-520260 | 7/2004 |
| JP | 2005-36214 | 2/2005 |
| JP | 2005-264108 | 9/2005 |
| JP | 2008-056552 | 3/2008 |
| WO | WO 2005/023416 A1 | 3/2005 |

OTHER PUBLICATIONS

Chemical Abstracts Service, X. Fu et al., “Extraction-Solvotherrnal Process for Preparation of Spherical Molybdenum Disulfide Antifriction Material,” Abstract of CN 1 769 185 (May 10, 2006).

Chemical Abstracts Service, No. XP-002521634, D. Madhavi et al., “Growth, Structural and High Pressure Studies on MoS2 Single Crystal,” abstract of article from Indian Journal of Physics, vol. 78(11), pp. 1211-1214 (2004).

J. Wildervanck et al., “The Dichalcogenides of Technetium and Rhenium,” J. Less-Common Metals, vol. 24, pp. 73-81 (1971).

Dissertation Abstracts International, Jerome et al., “Synthesis, Structure and Characterization of New Ternary and Quaternary Chalcogenides from Supercritical Amine Systems,” vol. 58, No. 11, p. 5954 (May 1, 1998).

* cited by examiner

A

B

A

B

A

B

A

B

A

B

A

B

A

B

A

B

C

A

B

C

D

A

B 0007 25KV 10um

A

B

C

D

A a

B b

A

B

A

B

A

B

C

D

A

B

A

B

C

D d 0020 25KV 200um

SINGLE-CRYSTAL FINE POWDER OF SULFIDE OR SULFIDE COMPLEX AND METHOD FOR PREPARING THE SAME

TECHNICAL FIELD

The present invention relates to single-crystal fine powder of a sulfide or sulfide complex comprising at least one element selected from the group consisting of molybdenum (Mo), rhodium (Rh), ruthenium (Ru), and rhenium (Re) and a method for preparing the same.

BACKGROUND ART

Hydrothermal and solvothermal reactions have drawn attention as means for synthesizing compounds. For example, JP Patent Publication (kokai) No. 2005-36214 A discloses a method for preparing zinc sulfide particles having multiply twinned structures and an average particle diameter of 5 nm to 20 μm via a hydrothermal reaction of a sulfur ion and a zinc ion using water as a reaction solvent at 150° C. to 370° C. during the process of particle growth.

Various chalcogenide compounds have drawn attention as alternatives to existing expensive platinum catalysts.

DISCLOSURE OF THE INVENTION

Object of the Invention

The present invention provides single-crystal fine powder of a sulfide or sulfide complex comprising a given element.

Means for Attaining the Object

The present inventors discovered that the above object could be attained via a hydrothermal or solvothermal reaction and arrived at the present invention.

Specifically, the first aspect of the present invention concerns single-crystal fine powder of a sulfide or sulfide complex comprising a given element, the single-crystal fine powder of a sulfide or sulfide complex comprising at least one element selected from the group consisting of molybdenum (Mo), rhodium (Rh), ruthenium (Ru), and rhenium (Re).

The single-crystal fine powder of the present invention can be in various configurations, and an approximately spherical configuration is particularly preferable.

Examples in which sulfide is the single-crystal fine powder of the present invention include binary compounds selected from among molybdenum sulfide ($Mo_2S_2$, $MoS_2$, $Mo_2S_3$, $MoS_3$, or $MoS_4$), rhodium sulfide ($Rh_{17}S_{15}$, $Rh_9S_8$, $Rh_3S_4$, $Rh_2S_3$, or $Rh_2S_5$), ruthenium sulfide ($RuS_2$), and rhenium sulfide ($ReS_2$ or $Re_2S_7$). An example of a preferable sulfide complex is a ternary compound represented by Rh—X—S or Ru—X—S, wherein X is preferably at least one element selected from among molybdenum (Mo), palladium (Pd), selenium (Se), silicon (Si), tantalum (Ta), tellurium (Te), thorium (Th), vanadium (V), zinc (Zn), ruthenium (Ru), rhodium (Rh), antimony (Sb), and tungsten (W). Among them, ternary compounds, i.e., Rh—Mo—S and Ru—Mo—S, are the most preferable examples.

The average particle diameter of the single-crystal fine powder of the present invention is not necessarily limited, and powder having an average particle diameter of 1 nm to 100 nm is preferable.

The second aspect of the present invention concerns a method for preparing single-crystal fine powder of a sulfide or sulfide complex comprising at least one element selected from the group consisting of molybdenum (Mo), rhodium (Rh), ruthenium (Ru), and rhenium (Re), the method comprising steps of: preparing a solvent mixture from at least one compound comprising an element selected from among molybdenum (Mo), rhodium (Rh), ruthenium (Ru), and rhenium (Re) and a sulfur (S)-containing compound; and performing a hydrothermal or solvothermal reaction at a pressure and temperature that converts the solvent mixture into a supercritical or subcritical water or solvent. Solvents used for a solvothermal reaction are not limited, and examples of such solvent include xylene, acetone, and chloroform.

In the present invention, the hydrothermal or solvothermal reaction is preferably carried out at 200° C. to 600° C.

Also, thermal treatment in an inert gas atmosphere at 300° C. to 800° C. following the step of a hydrothermal or solvothermal reaction can improve crystallinity, thereby dispersing residues of starting compounds, such as carbonyl groups.

Effects of the Invention

The present invention can provide single-crystal fine powder of a sulfide or sulfide complex comprising at least one element selected from the group consisting of molybdenum (Mo), rhodium (Rh), ruthenium (Ru), and rhenium (Re). In particular, the present invention can provide a fine spherical single crystal. Such single-crystal fine powder of a sulfide or sulfide complex comprising a given element is used for known applications, and a wider variety of applications can be expected by making use of its characteristics. For example, such powder can be utilized for a catalyst for a fuel cell while serving as a cost-effective alternative to an existing platinum catalyst. Also, $MoS_2$ known as a lubricant is a fine spherical single crystal and thus can be used as a superior lubricant. Further, adequate selection of a dopant element with which the powder is to be doped enables manifestation of various physical properties.

BEST MODES FOR CARRYING OUT THE INVENTION

The present invention is intended to explore the possibility of synthesizing $MoS_2$, $RuS_2$, $Rh_2S_3$, or $ReS_2$ via a hydrothermal or solvothermal reaction and is also intended to synthesize a binary or ternary sulfide solid solution.

Figure 1:
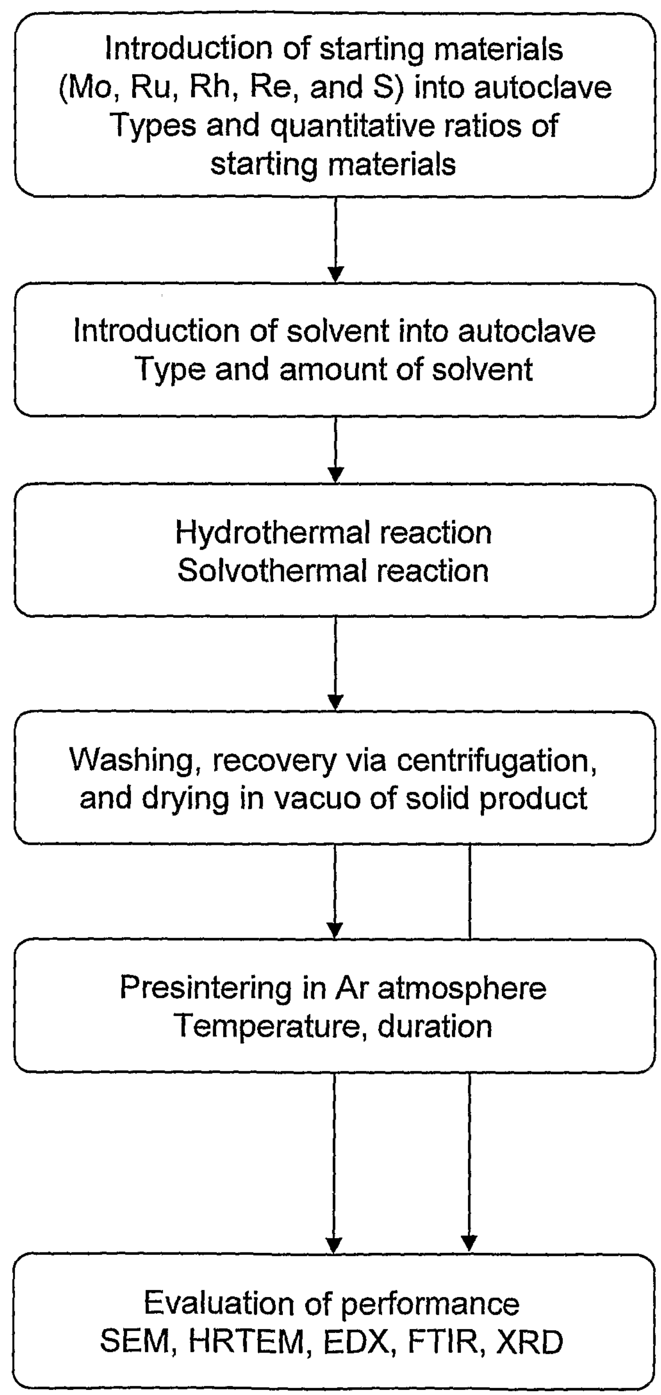
FIG. 1 is a flow chart detailing the method of synthesis via a hydrothermal or solvothermal reaction of the present invention.

FIG. 1 shows a flow chart detailing the method of synthesis via a hydrothermal or solvothermal reaction of the present invention. A Teflon-lined autoclave was used for a low-temperature reaction, and a Hastelloy-C-lined autoclave was used for a high-temperature reaction. The reaction was carried out in situ. Specific conditions for synthesis are described below.

The conditions are as shown in FIG. 1.

(1) Starting materials (Mo, Ru, Rh, Re, and S) are introduced into an autoclave. The types and the quantitative ratio of starting materials are determined.

(2) A solvent is introduced into an autoclave. The type and the amount of the solvent are determined.

(3) A hydrothermal or solvothermal reaction is carried out.

(4) A solid product is washed, recovered with the use of a centrifuger, and then dried in vacuo.

(5) Precalcination is carried out in an inert gas atmosphere, such as Ar. The temperature and the duration are determined.

(6) Properties are evaluated by means of SEM, HRTEM, EDX, FTIR, XRD, or other means.

Example 1

Synthesis of $MoS_2$ $Mo(CO)_6$, $MoCl_5$, $(NH_4)_6Mo_7O_{24}.4H_2O$, and $(NH_4)_3[PO_4Mo_{12}O].3H_2O$ were used as starting materials for Mo, S (solid sulfur) and thiourea ($(NH_2)_2CS$) were used as starting materials for S, and xylene or distilled water was used as a solvent. A solvothermal or hydrothermal reaction was carried out at 220° C. or 350° C. for 10 hours. Thereafter, precalcination was carried out in an Ar atmosphere at 350° C. to 750° C. for 5 hours.

1.1: Synthesis of $MoS_2$ Via Solvothermal Reaction

When $Mo(CO)_6$ and S were used as starting materials for the solvothermal reaction, well-dispersed $MoS_2$ powder was obtained. $MoS_2$ powder that had been synthesized at a low temperature of 220° C. for 10 hours had low crystallinity, although the crystallinity was improved via precalcination in an argon atmosphere at 350° C. By synthesizing the powder at a high temperature (350° C.) for 10 hours, the crystallinity of the resulting powder was improved, compared with powder synthesized at a low temperature.

1.1.1: Influence Imposed by Starting Materials for Mo

A synthesis experiment was performed using $Mo(CO)_6$ or $MoCl_5$ as a starting material for Mo at 220° C. for 10 hours. When using $MoCl_5$ as a starting material, the resulting $MoS_2$ powder had a somewhat higher crystallinity, and particles were more firmly aggregated. Thus, $Mo(CO)_6$ was employed as a starting material for Mo.

Figure 2:
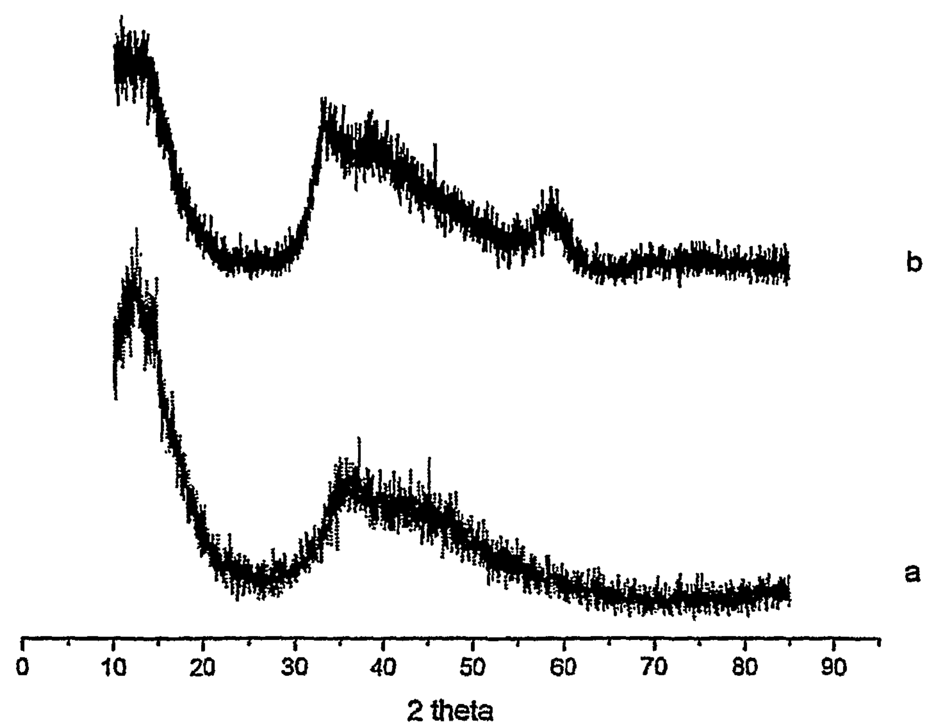
FIG. 2 shows an XRD pattern of $MoS_2$ synthesized via a solvothermal reaction.

FIG. 2 shows an XRD pattern of $MoS_2$ synthesized via a solvothermal reaction, with the solvent being xylene, the temperature being 220° C., and the duration being 10 hours. In the figure, "a" represents $MoCl_5$+S and "b" represents $Mo(CO)_6$+S.

Figure 3:
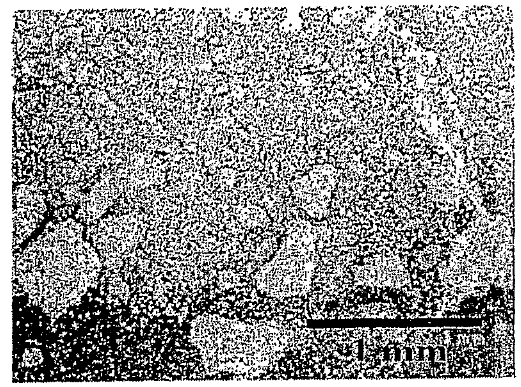
FIG. 3 shows an SEM photograph of $MoS_2$ powder synthesized from $MoCl_5$ (precalcined at 400° C. for 5 hours).
Figure 3:
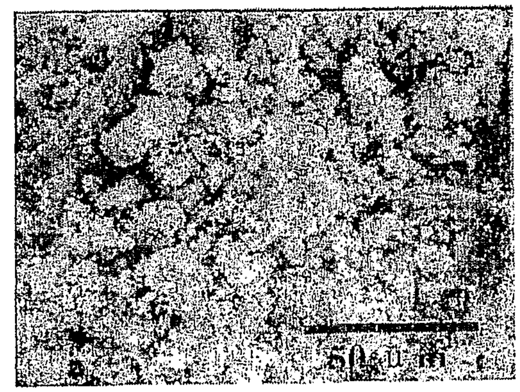

FIG. 3 shows an SEM photograph of $MoS_2$ powder synthesized from $MoCl_5$ (precalcined at 400° C. for 5 hours).

1.1.2: Influence Imposed by Starting Materials for S

A synthesis experiment was performed using S or thiourea as a starting material for sulfur at 220° C. for 10 hours. The resulting $MoS_2$ powder had a relatively higher crystallinity when synthesized from S. In contrast, the resultant became firmly aggregated when thiourea was used as a starting material. Thus, S was employed as a sulfur source.

Figure 4:
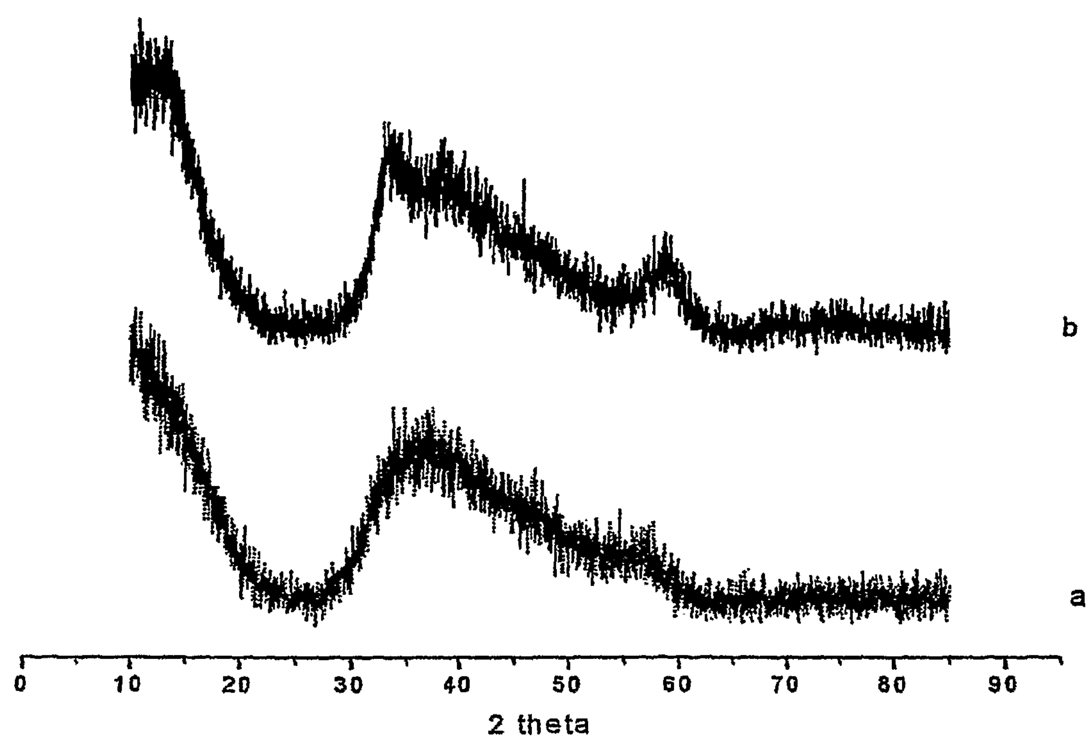
FIG. 4 shows an XRD pattern of $MoS_2$ synthesized via a solvothermal reaction.

FIG. 4 shows an XRD pattern of $MoS_2$ synthesized via a solvothermal reaction, with the solvent being xylene, the temperature being 220° C., and the duration being 10 hours. In the figure, "a" represents $Mo(CO)_6$+ thiourea, and "b" represents $Mo(CO)_6$+S.

Figure 5:
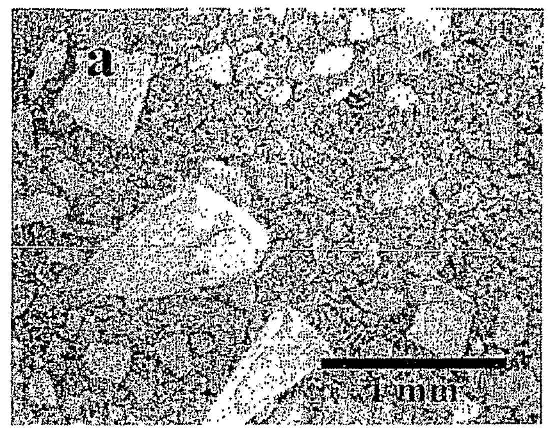
FIG. 5 shows an SEM photograph of $MoS_2$ powder synthesized from thiourea (precalcined at 400° C. for 5 hours).
Figure 5:
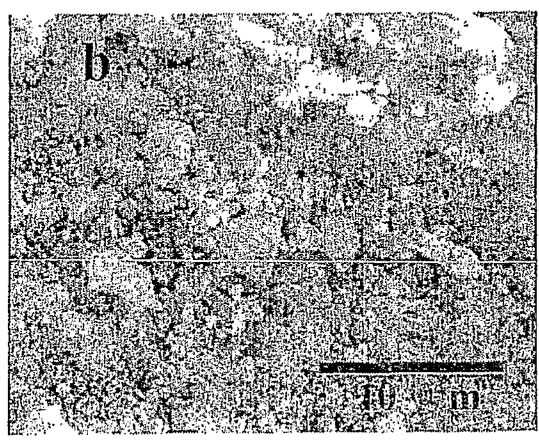

FIG. 5 shows an SEM photograph of $MoS_2$ powder synthesized from thiourea (precalcined at 400° C. for 5 hours).

Figure 6:
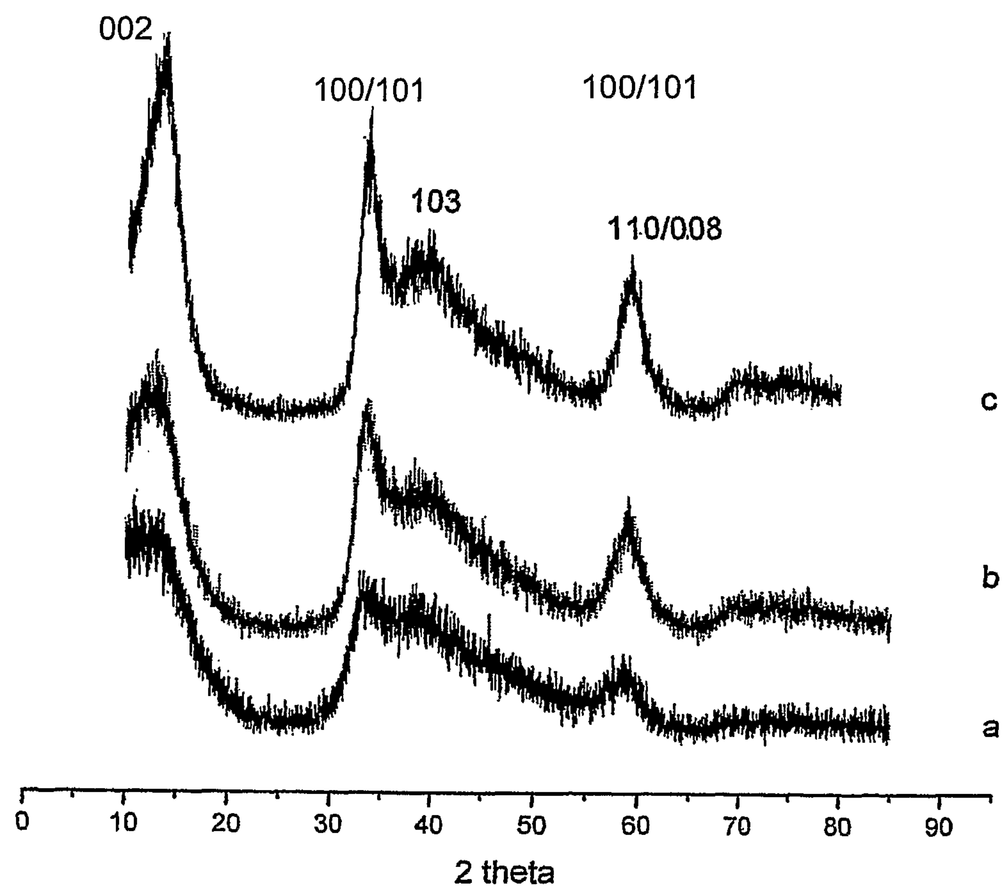
FIG. 6 shows XRD patterns of $MoS_2$ synthesized via a solvothermal reaction (a) and the resultant of precalcination thereof (b, c).

1.1.3: Effects of Precalcination $MoS_2$ synthesized from $Mo(CO)_6$ and S via a solvothermal reaction at 220° C. for 10 hours was precalcined in an Ar stream. FIG. 6 shows XRD patterns of $MoS_2$ synthesized via a solvothermal reaction (a) and resultant of precalcination thereof (b, c); wherein "b" represents 350° C. for 2 hours and "c" represents 600° C. for 2 hours.

As shown in FIG. 6, crystallinity was increased via precalcination at 350° C., and the crystallinity attained via precalcination at 600° C. was not very different from that attained at 350° C. Thus, precalcination was determined to be carried out at 400° C. or higher for 5 hours in the following experiments.

1.1.4: Influence Imposed by S:Mo Ratio

Figure 7:
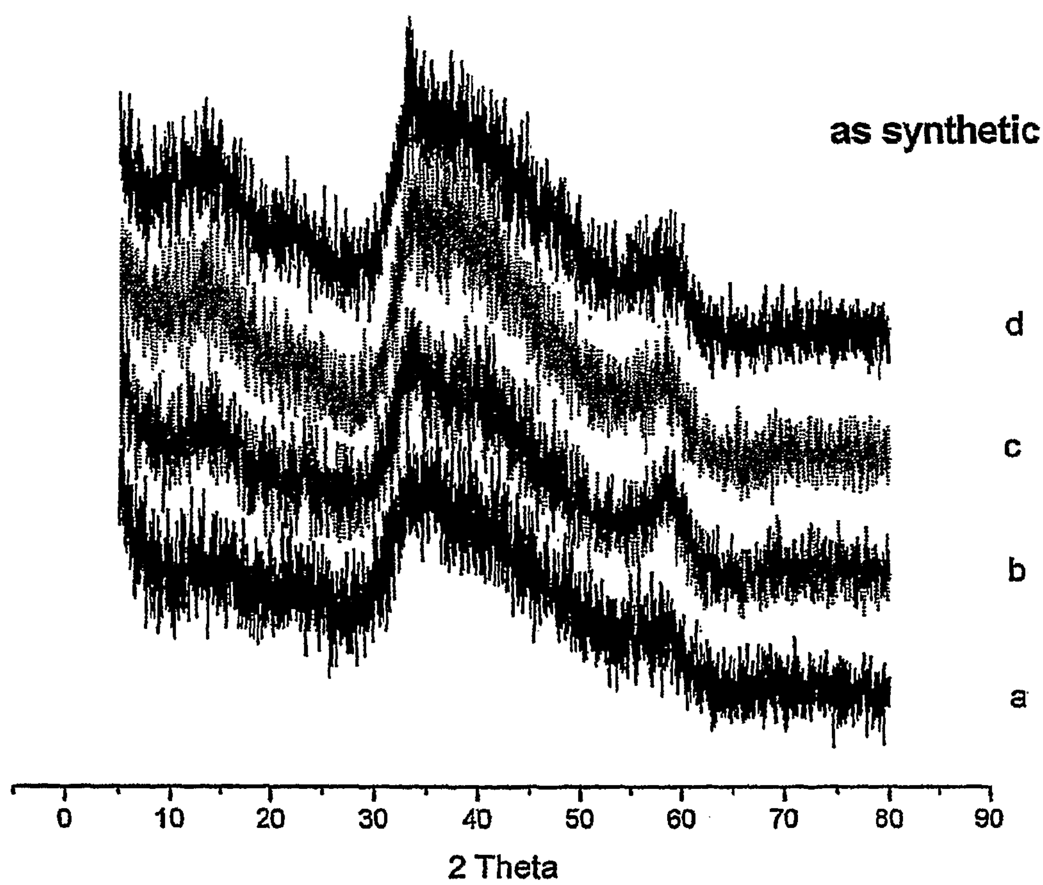
FIG. 7 shows XRD patterns of $MoS_2$ products synthesized from $Mo(CO)_6$ and S while varying S:Mo ratios via a solvothermal reaction at 220° C. for 10 hours.
Figure 8:
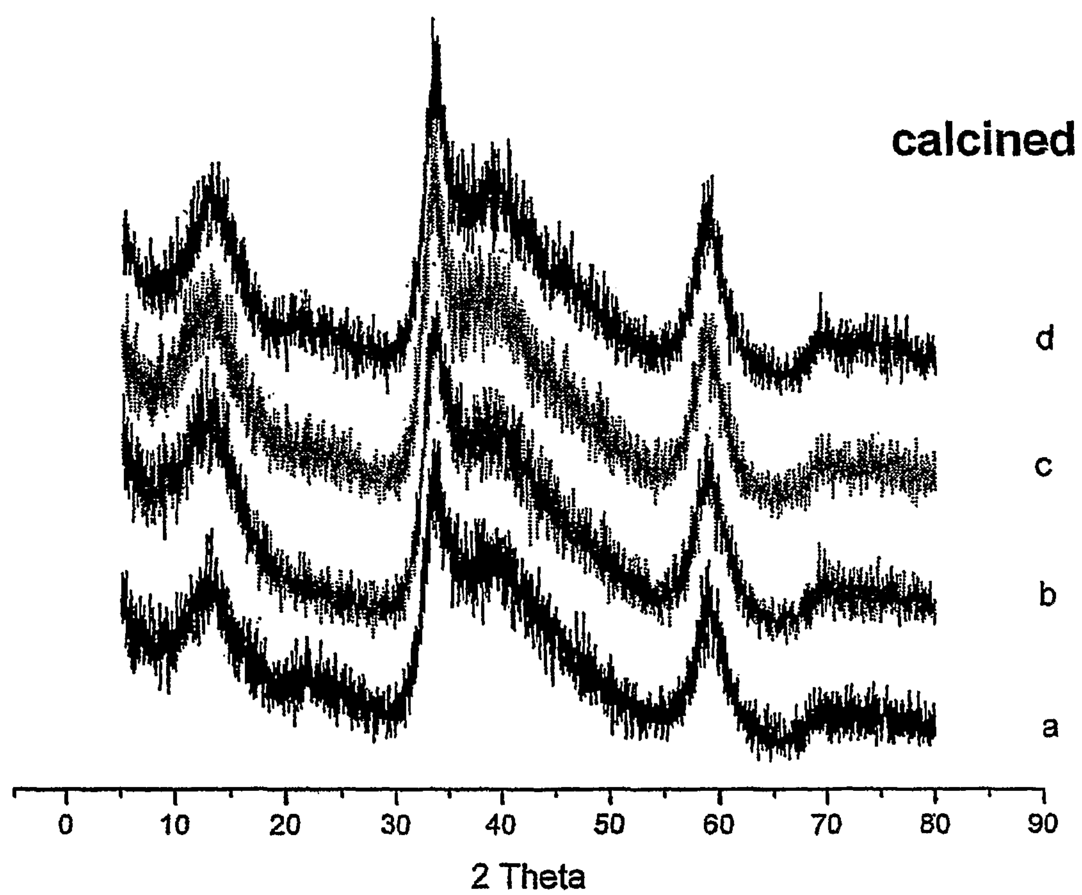
FIG. 8 shows XRD patterns of the resultant of precalcination of $MoS_2$ at 400° C. for 5 hours. Such resultants were synthesized from $Mo(CO)_6$ and S via a solvothermal reaction at 220° C. for 10 hours while varying S:Mo ratios.

When synthesizing $MoS_2$ from $Mo(CO)_6$ and S via a solvothermal reaction at 220° C. for 10 hours, an S:Mo ratio of starting materials was varied. FIG. 7 shows XRD patterns of $MoS_2$ products synthesized from $Mo(CO)_6$ and S via a solvothermal reaction at 220° C. for 10 hours while varying S:Mo ratios. Also, FIG. 8 shows XRD patterns of a resultant of precalcination of $MoS_2$ at 400° C. for 5 hours that were synthesized from $Mo(CO)_6$ and S via a solvothermal reaction at 220° C. for 10 hours while varying S:Mo ratios. In these figures, "a" represents an S:Mo ratio of 1.6:1, "b" represents a ratio of 2.0:1, "c" represents a ratio of 2.4:1, and "d" represents a ratio of 3.0:1.

As shown in FIG. 7 and in FIG. 8, the resulting product had a monolayer structure of $MoS_2$, even when the S:Mo ratio was varied from 1.6:1 to 3.0:1. When the S:Mo ratio was 2.0:1 or higher, crystallinity of $MoS_2$ was somewhat increased. No difference was observed in crystallinity of products precalcined at 400° C. for 5 hours in an argon stream.

Figure 9:
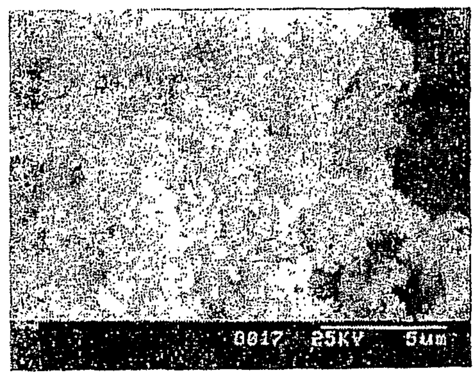
FIG. 9A shows a scanning electron micrograph of $MoS_2$ resulting from a solvothermal reaction.
FIG. 9B shows that of a resultant of precalcination thereof at 400° C. for 5 hours.
Figure 9:
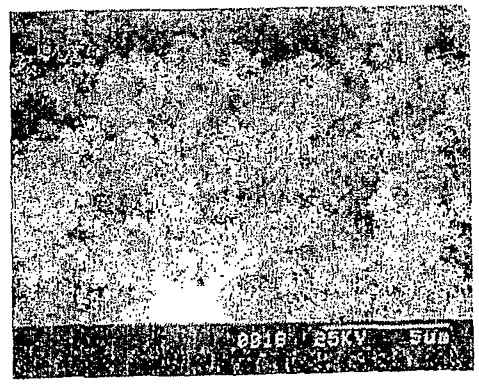
Figure 10:
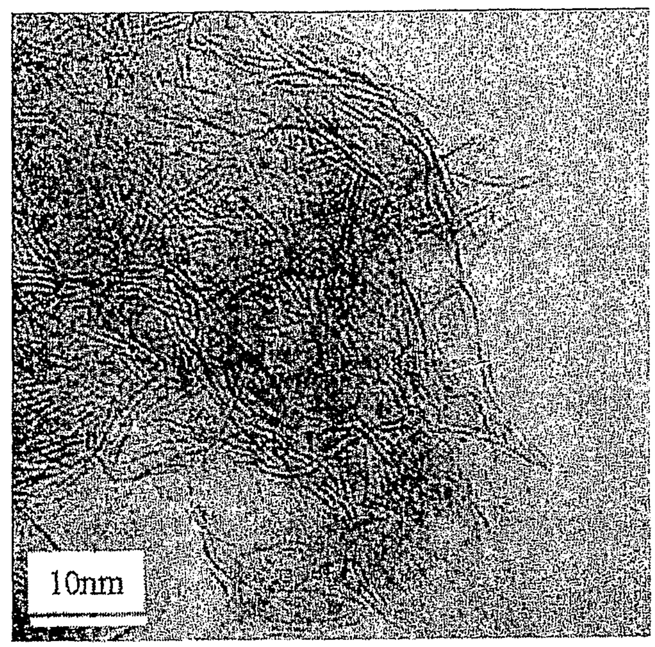
FIG. 10 shows a transmission electron micrograph of a resultant of precalcination, at 400° C. for 5 hours, of $MoS_2$ resulting from a solvothermal reaction.

1.1.5: Microscopic Observation of $MoS_2$ $MoS_2$ synthesized from $Mo(CO)_6$ and S via a solvothermal reaction at 220° C. for 10 hours at an S:Mo ratio of 2.4:1 and a resultant of precalcination thereof at 400° C. for 5 hours were observed under an electron microscope. FIG. 9A shows a scanning electron micrograph of $MoS_2$ resulting from a solvothermal reaction, and FIG. 9B shows that of a resultant of precalcination thereof at 400° C. for 5 hours. FIG. 10 shows a transmission electron micrograph of a resultant of precalcination, at 400° C. for 5 hours, of $MoS_2$ resulting from a solvothermal reaction. The resulting $MoS_2$ was found to be composed of well-dispersed fine particles of about 100 nm, which was significantly different from $MoS_2$ synthesized from other Mo starting materials shown in FIGS. 3A, 3B, 5A, and 5B. In particular, enhanced aggregation was not observed as a result of precalcination.

As a result of transmission electron microscopic observation, the product was found to have a fine structure of multiple layers of fibers. The XRD pattern of the resultant may be different from that described in the JCPDS in terms of diffraction intensities, because of such structure.

1.1.6: Synthesis at High Temperature

Figure 11:
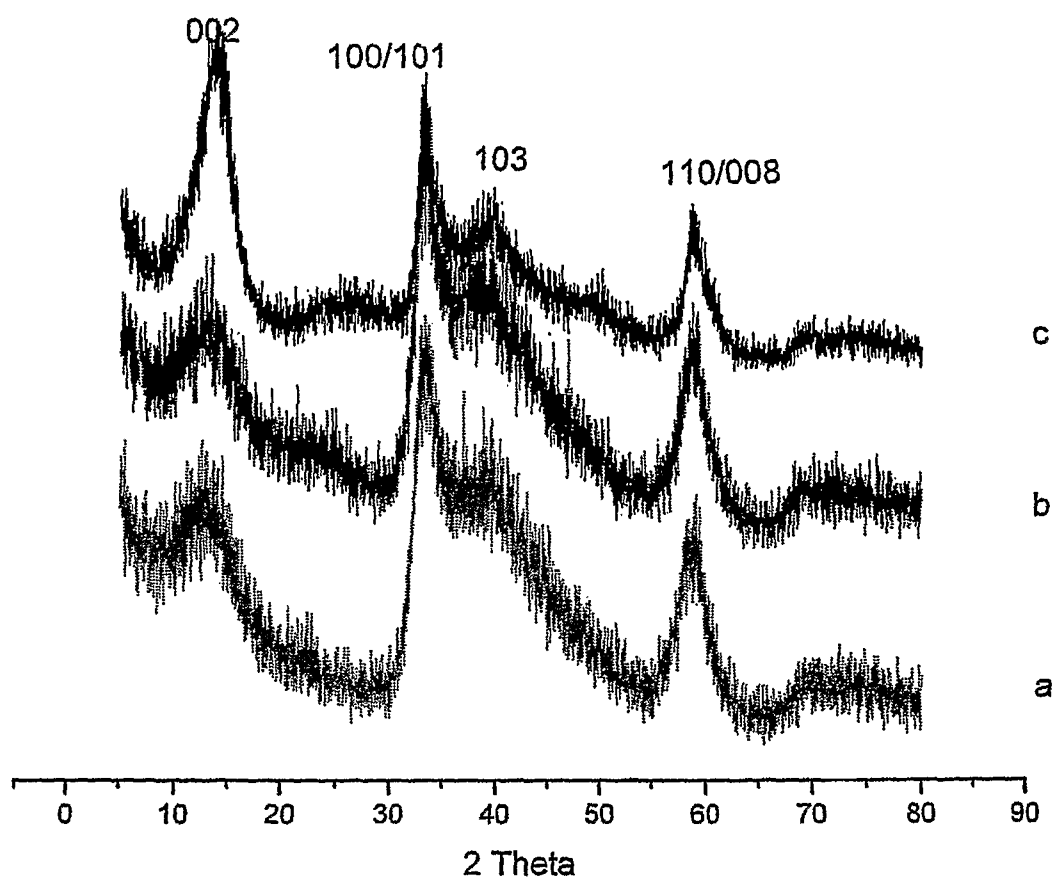
FIG. 11 shows an XRD pattern of $MoS_2$ resulting from a solvothermal reaction.
Figure 12:
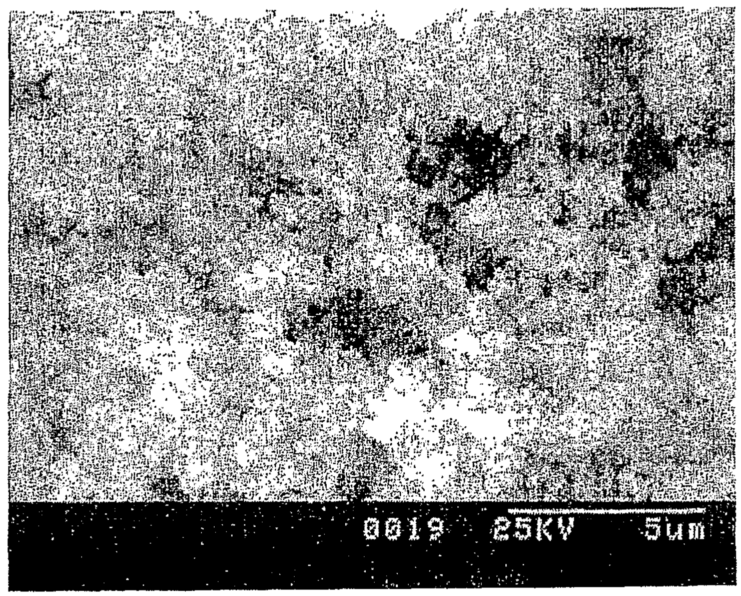
FIGS. 12A and 12B each show an electron micrograph of $MoS_2$ resulting from a solvothermal reaction.
Figure 12:
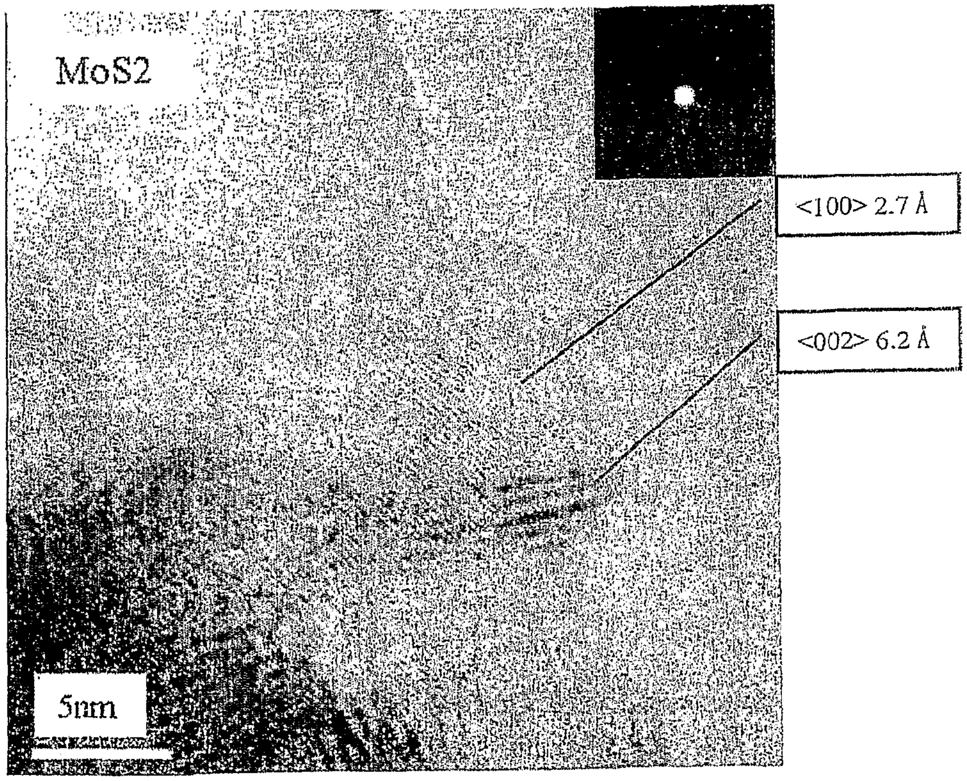

Synthesis of $MoS_2$ from $Mo(CO)_6$ and S via a solvothermal reaction at a higher temperature of 350° C. for 10 hours was attempted while varying the S:Mo ratio. FIG. 11 shows an XRD pattern of $MoS_2$ resulting from a solvothermal reaction. Also, FIGS. 12A and 12B each show an electron micrograph of $MoS_2$ resulting from a solvothermal reaction.

By raising the reaction temperature, the crystallinity of the resulting $MoS_2$ was improved to a level equivalent to that attained via precalcination. When the S:Mo ratio was particularly high, the diffraction intensity of (002) was increased.

As a result of scanning electron microscopic observation, the configuration of the product was found to be the same as the configuration resulting from a low-temperature reaction, and it was found to be composed of fine particles. As a result of transmission electron microscopic observation, two components, i.e., a fibrous layer having a potent contrast and a lattice layer having relatively high crystallinity, were observed. The lattice intervals were found to be 6.2 Å and 2.7 Å, which were considered to correspond to <002> and <100> of $MoS_2$.

It was thus demonstrated that $MoS_2$ with high crystallinity and excellent dispersibility could be synthesized via a solvothermal reaction using $Mo(CO)_6$ and S as starting materials at an S:Mo ratio of 3:1 at 350° C. for 10 hours.

1.2: Synthesis of $MoS_2$ Via Hydrothermal Reaction

Synthesis of $MoS_2$ was attempted via a hydrothermal reaction using $MoCl_5$, $(NH_4)_6Mo_7O_{24}.4H_2O$, and $(NH_4)_3[PO_4Mo_{12}O].3H_2O$ as starting materials for Mo and thiourea ($(NH_2)_2CS$) as a starting material for S. As a result, $MoS_2$ having a higher crystallinity, compared with the crystallinity attained via a solvothermal reaction, was obtained. When sodium hydroxide was added to $MoCl_5$, $MoS_2$ composed of fine particles having relatively high dispersibility was obtained with the use of $(NH_4)_6Mo_7O_{24}.4H_2O$ or $(NH_4)_3[PO_4Mo_{12}O].3H_2O$ as a starting material.

1.2.1: Reaction Between $MoCl_5$ and Thiourea with the Addition of Ammonia

Figure 13:
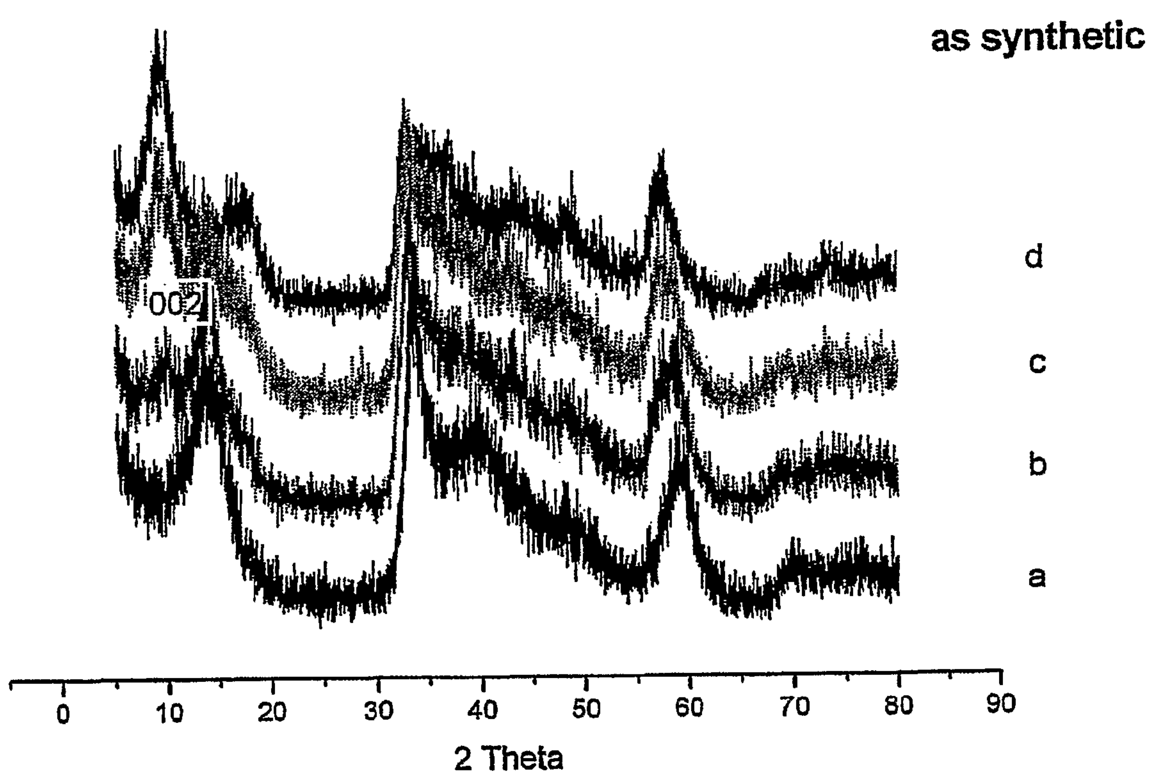
FIG. 13 shows an XRD pattern of $MoS_2$ hydrothermally synthesized at 220° C. for 10 hours with the addition of ammonia.
Figure 14:
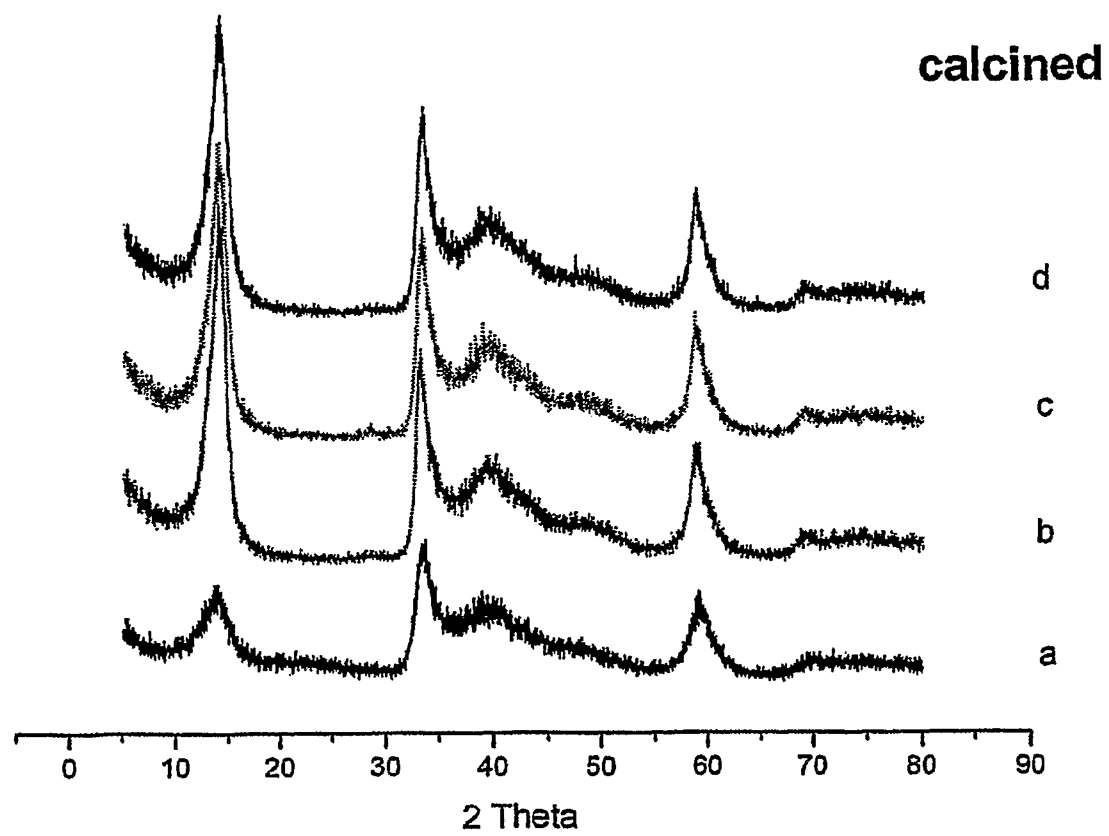
FIG. 14 shows an XRD pattern of a resultant of precalcination, in an argon stream at 400° C. for 5 hours, of $MoS_2$ hydrothermally synthesized with the addition of ammonia.
Figure 15:
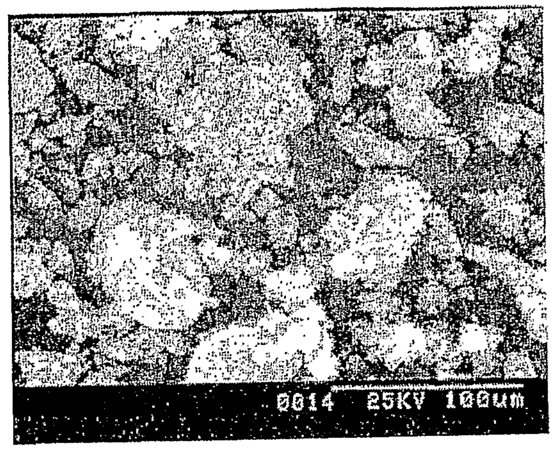
FIGS. 15A and 15B each show a scanning electron micrograph of $MoS_2$ (S:Mo ratio of 2.2:1) hydrothermally synthesized at 220° C. for 10 hours with the addition of ammonia.
Figure 15:
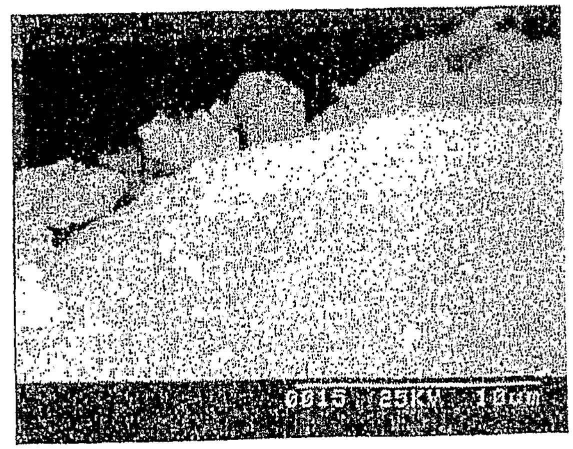

Synthesis of $MoS_2$ was attempted using $MoCl_5$ and thiourea as starting materials while varying the quantitative ratio thereof and varying the amount of ammonia to be added, at 220° C. for 10 hours. FIG. 13 shows an XRD pattern of $MoS_2$ hydrothermally synthesized at 220° C. for 10 hours with the addition of ammonia. FIG. 14 shows an XRD pattern of a resultant of precalcination, in an argon stream at 400° C. for 5 hours, of $MoS_2$ hydrothermally synthesized with the addition of ammonia. In these figures, "a" represents an S:Mo ratio of 2.2:1 and without the addition of ammonia, "b" represents an S:Mo ratio of 2.2:1 in the presence of 50% of ammonia by volume, "c" represents an S:Mo ratio of 3.0:1 in the presence of 50% of ammonia by volume, and "d" represents an S:Mo ratio of 4.0:1 in the presence of 50% of ammonia by volume. Further, FIGS. 15A and 15B each show a scanning electron micrograph of $MoS_2$ (S:Mo ratio of 2.2:1) hydrothermally synthesized at 220° C. for 10 hours with the addition of ammonia.

When the S:Mo ratio was 30:1, a product exhibiting a deviated diffraction line (002) was obtained, regardless of the presence or absence of ammonia. When this product was precalcined at 400° C., the same diffraction pattern as that of conventional $MoS_2$ was obtained. When the S:Mo ratio was 30:1, some sort of substances may have been introduced into a site between layers. Precalcination resulted in improved crystallinity. In general, the product was firmly aggregated.

Figure 16:
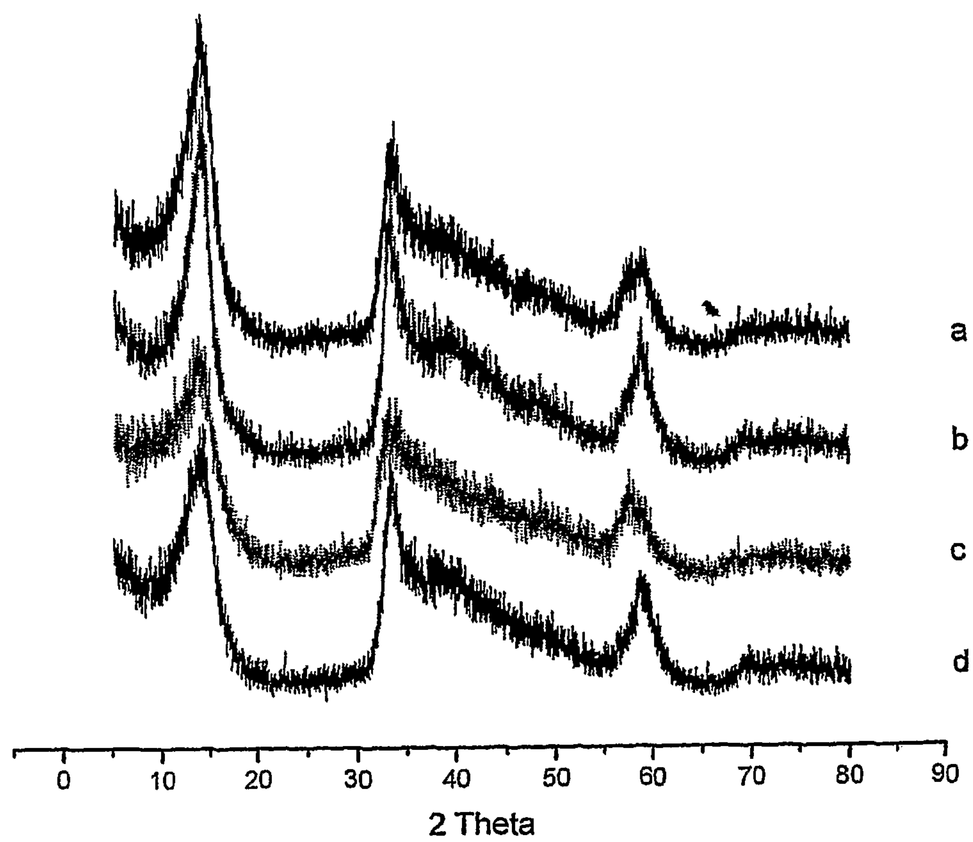
FIG. 16 shows an XRD pattern of $MoS_2$ hydrothermally synthesized at 220° C. for 10 hours with the addition of sodium hydroxide at an S:Mo ratio of 2.2:1 and that of $MoS_2$ precalcined at 400° C. for 5 hours in an argon stream.
Figure 17:
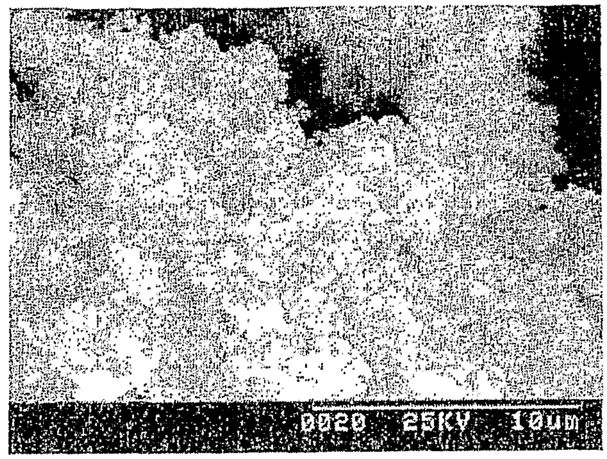
FIG. 17 shows a scanning electron micrograph of $MoS_2$ hydrothermally synthesized at 220° C. for 10 hours in an aqueous solution of 0.6M NaOH(S:Mo ratio of 2.2:1).

1.2.2: Reaction Between $MoCl_5$ and Thiourea with the Addition of Sodium Hydroxide FIG. 16 shows an XRD pattern of $MoS_2$ hydrothermally synthesized at 220° C. for 10 hours with the addition of sodium hydroxide at an S:Mo ratio of 2.2:1 and that of $MoS_2$ precalcined at 400° C. for 5 hours in an argon stream. In the figure, "a" represents an aqueous 0.6 M NaOH solution, "b" represents an aqueous 0.9 M NaOH solution, "c" represents an aqueous 1.2 M NaOH solution, and "d" represents an aqueous 1.8 M NaOH solution. FIG. 17 shows a scanning electron micrograph of $MoS_2$ hydrothermally synthesized at 220° C. for 10 hours in an aqueous 0.6M NaOH solution (an S:Mo ratio of 2.2:1).

$MoS_2$ synthesized with the addition of sodium hydroxide had relatively high crystallinity and was composed of well-dispersed fine spherical particles.

1.2.3: Reaction Between $(NH_4)_3[PO_4Mo_{12}O].3H_2O$ and Thiourea

Figure 18:
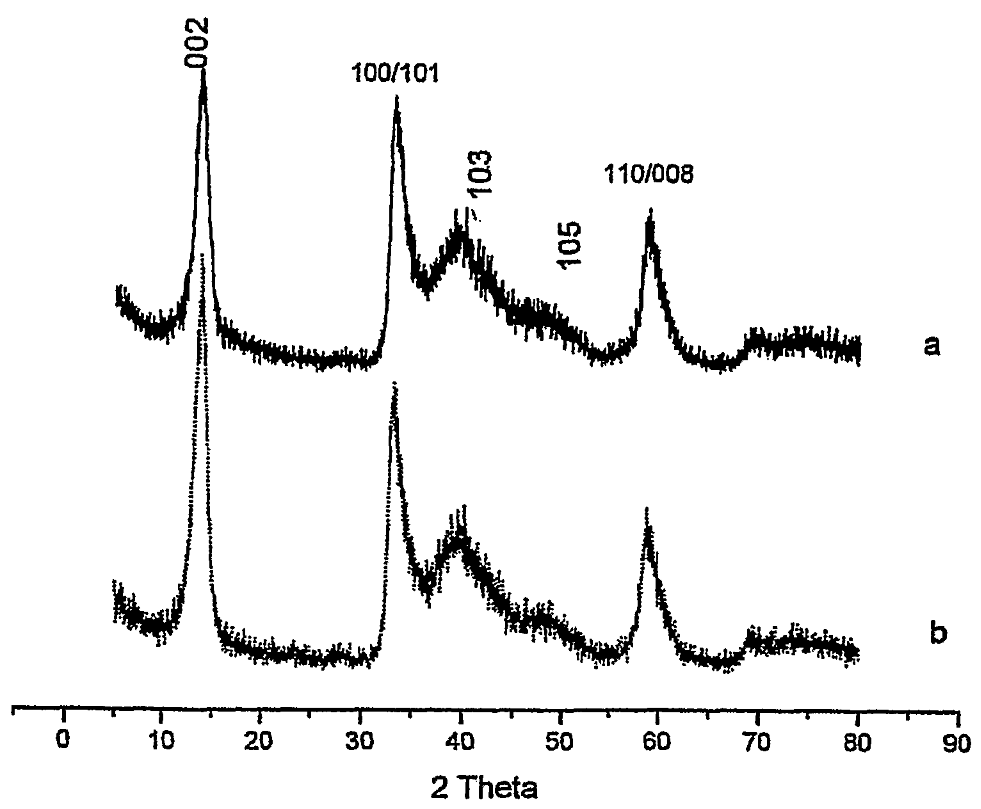
FIG. 18 shows an XRD pattern of a resultant of a hydrothermal reaction of $(NH_4)_3[PO_4Mo_{12}O].3H_2O$ and thiourea and that of a resultant of precalcination thereof.
Figure 19:
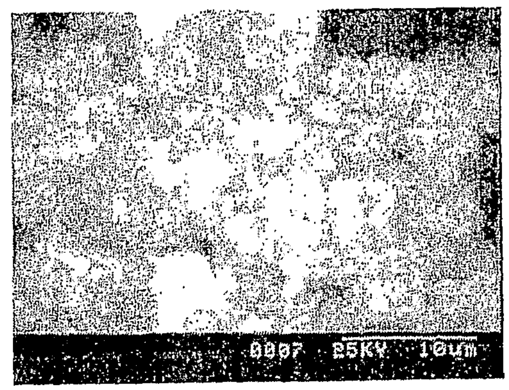
FIGS. 19A and 19B each show a scanning electron micrograph of a resultant of a hydrothermal reaction of $(NH_4)_3[PO_4Mo_{12}O].3H_2O$ and thiourea and that of a resultant of precalcination thereof.
Figure 19:
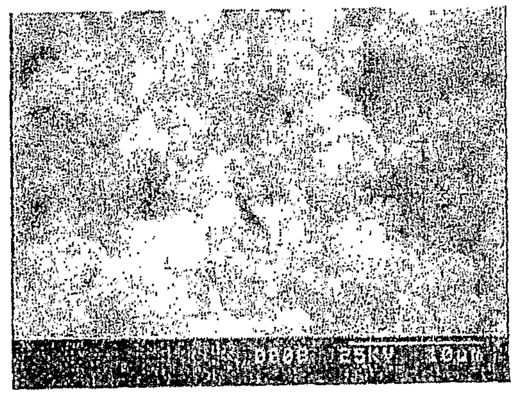
Figure 20:
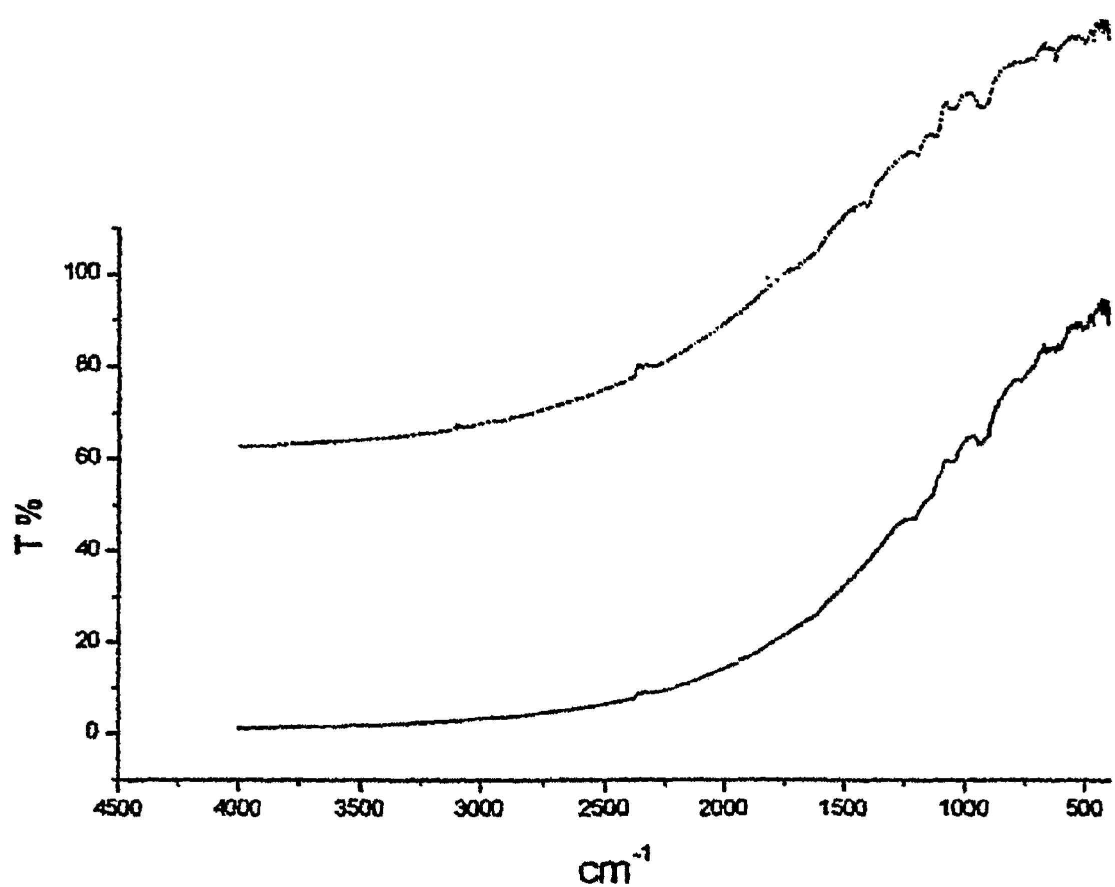
FIG. 20 shows the FTIR spectra of a resultant of a hydrothermal reaction of $(NH_4)_3[PO_4Mo_{12}O].3H_2O$ and thiourea and that of a resultant of precalcination thereof.

FIG. 18 shows an XRD pattern of a resultant of a hydrothermal reaction of $(NH_4)_3[PO_4Mo_{12}O].3H_2O$ and thiourea and that of a resultant of precalcination thereof. FIGS. 19A and 19B each show a scanning electron micrograph of a resultant of a hydrothermal reaction of $(NH_4)_3[PO_4Mo_{12}O].3H_2O$ and thiourea and that of a resultant of precalcination thereof. FIG. 20 shows the FTIR spectra of a resultant of a hydrothermal reaction of $(NH_4)_3[PO_4Mo_{12}O].3H_2O$ and thiourea and that of a resultant of precalcination thereof. In these figures, "a" represents a hydrothermally synthesized product at 220° C. for 10 hours and "b" represents a calcined product (400° C. for 5 hours).

The resulting product had high crystallinity, and crystallinity was not improved via precalcination. The sample was composed of fine particles having relatively high dispersibility. The FTIR spectra did not show any absorption resulting from organic matter.

1.2.4: Reaction Between $(NH_4)_6Mo_7O_{24}.4H_2O$ and Thiourea

Figure 21:
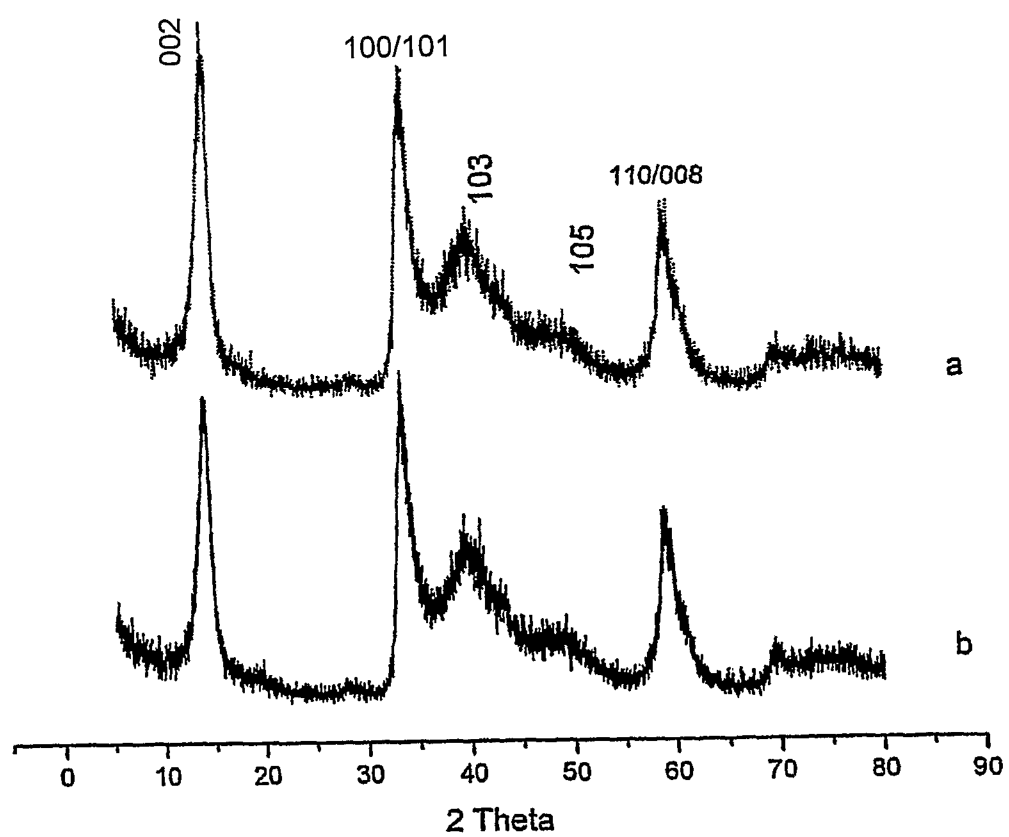
FIG. 21 shows an XRD pattern of a resultant of a hydrothermal reaction of $(NH_4)_6Mo_7O_{24}.4H_2O$ and thiourea and that of a resultant of precalcination thereof.
Figure 22:
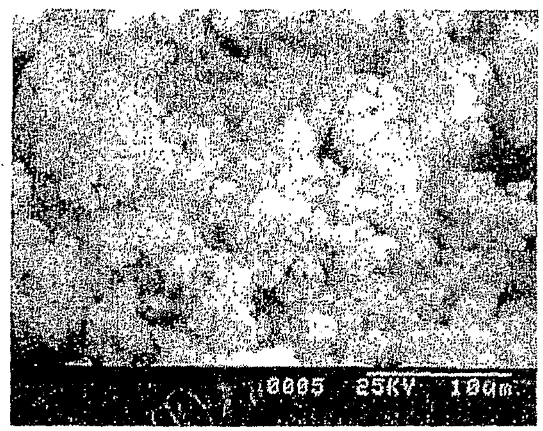
FIGS. 22A and 22B each show a scanning electron micrograph of a resultant of a hydrothermal reaction of $(NH_4)_6Mo_7O_{24}.4H_2O$ and thiourea and that of a resultant of precalcination thereof.
Figure 22:
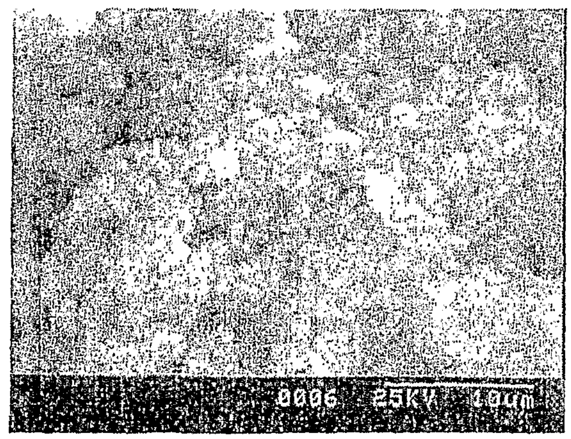
Figure 23:
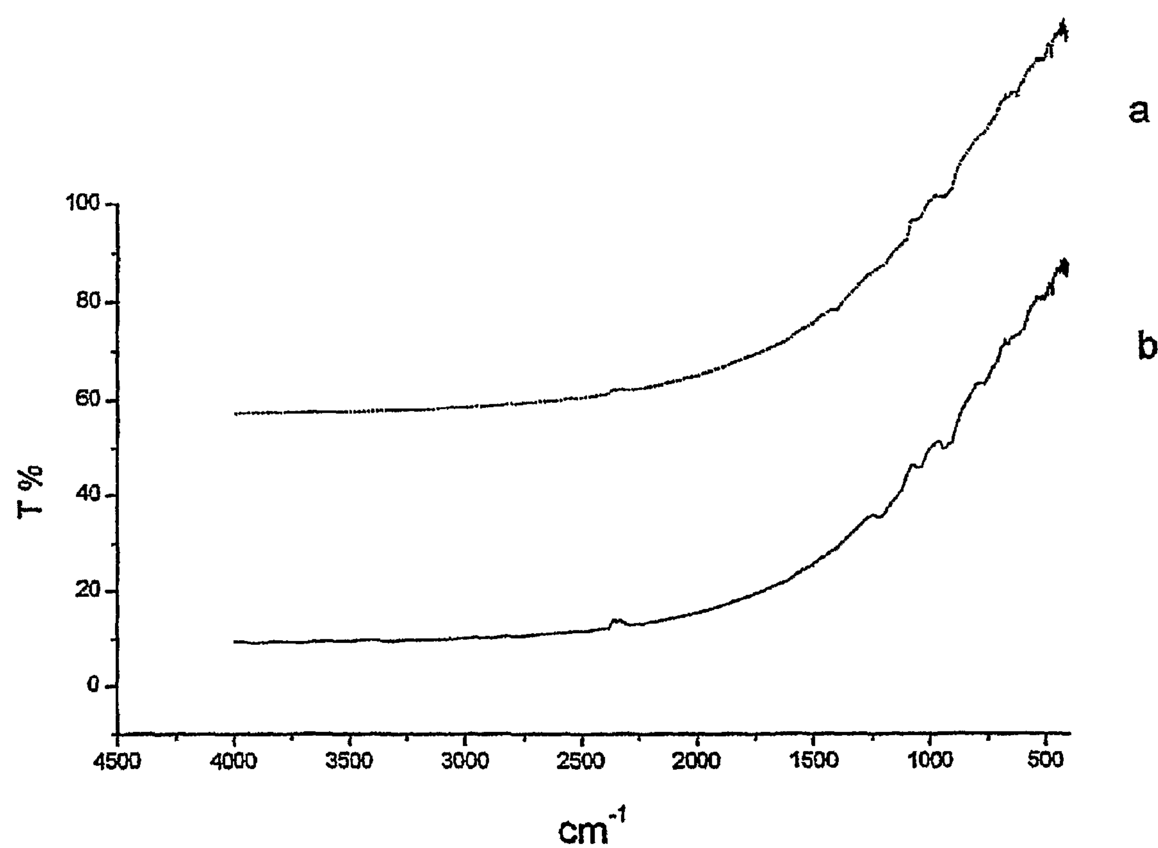
FIG. 23 shows the FTIR spectra of a resultant of a hydrothermal reaction of $(NH_4)_6Mo_7O_{24}.4H_2O$ and thiourea and that of a resultant of precalcination thereof.

FIG. 21 shows an XRD pattern of a resultant of a hydrothermal reaction of $(NH_4)_6Mo_7O_{24}.4H_2O$ and thiourea and that of a resultant of precalcination thereof. FIGS. 22A and 22B each show a scanning electron micrograph of a resultant of a hydrothermal reaction of $(NH_4)_6Mo_7O_{24}.4H_2O$ and thiourea and that of a resultant of precalcination thereof. FIG. 22A shows a product hydrothermally synthesized at 220° C. for 10 hours, and FIG. 22B shows a calcined product (calcined in argon at 400° C. for 5 hours). FIG. 23 shows the FTIR spectra of a resultant of a hydrothermal reaction of $(NH_4)_6Mo_7O_{24}.4H_2O$ and thiourea and that of a resultant of precalcination thereof. In these figures, "a" represents a product hydrothermally synthesized at 220° C. for 10 hours and "b" represents a calcined product (calcined in argon at 400° C. for 5 hours).

The results attained with the use of $(NH_4)_6Mo_7O_{24}.4H_2O$ as a starting material were the same as those attained with the use of $(NH_4)_3[PO_4Mo_{12}O].3H_2O$ as a starting material.

The resulting product had high crystallinity, and crystallinity was not improved via precalcination. The sample was composed of fine particles having relatively high dispersibility. The FTIR spectra did not show any absorption resulting from organic matter.

Example 2

Synthesis of $RuS_2$ $Ru(CO)_{12}$ was used as a starting material for Ru, S (solid sulfur) was used as a starting material for S, and xylene or distilled water was used as a solvent to conduct a solvothermal or hydrothermal reaction at 220° C. for 10 hours. Thereafter, precalcination was carried out in an Ar atmosphere at 400° C. for 5 hours.

2.1: Synthesis of $RuS_2$ Via Solvothermal Reaction

Figure 24:
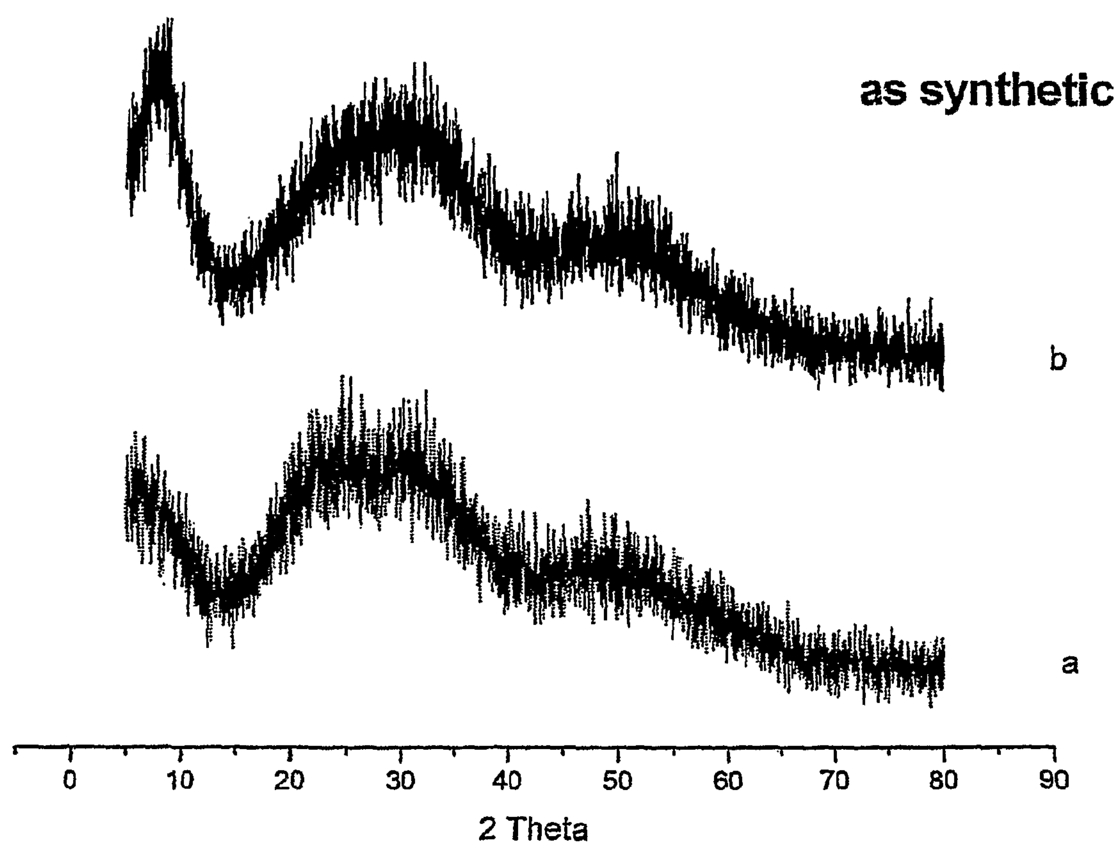
FIG. 24 shows an XRD pattern of $RuS_2$ synthesized via a solvothermal reaction at 220° C. for 10 hours while varying S:Ru ratios.

FIG. 24 shows an XRD pattern of $RuS_2$ synthesized via a solvothermal reaction at 220° C. for 10 hours while varying S:Ru ratios. In the figure, "a" represents an S:Ru ratio of 6:1, and "b" represents an S:Ru ratio of 4:1. Regardless of the S:Ru ratio, the product exhibited low crystallinity. The FTIR spectra of $RuS_2$ synthesized via a solvothermal reaction at 220° C. for 10 hours and a resultant of precalcination thereof shown in FIG. 24 demonstrate that the resultant of a solvothermal reaction contains organic matter. In the figure, "a" represents resulting $RuS_2$, and "b" represents a resultant of precalcination thereof.

Figure 25:
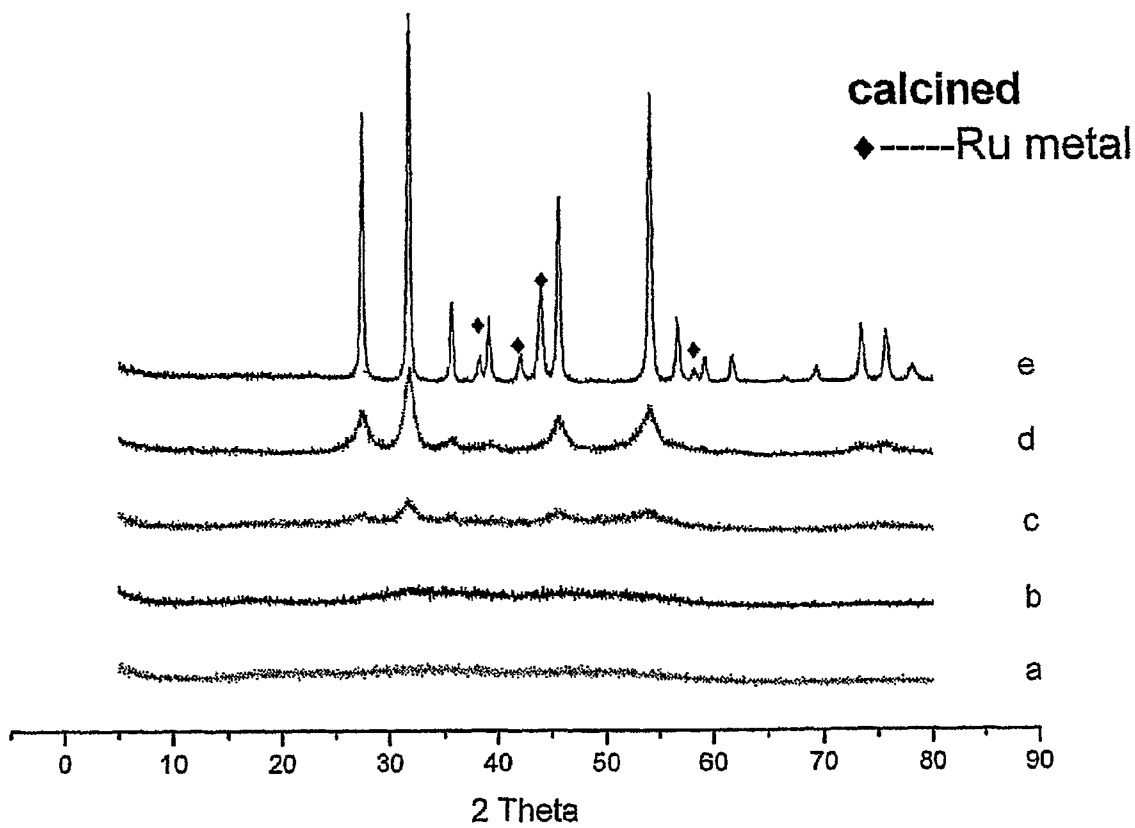
FIG. 25 shows an XRD pattern of a resultant of precalcination, in an argon stream at 400° C. for 5 hours, of $RuS_2$ synthesized via a solvothermal reaction at 220° C. for 10 hours.

FIG. 25 shows an XRD pattern of a resultant of precalcination, in an argon stream at 400° C. for 5 hours, of $RuS_2$ synthesized via a solvothermal reaction at 220° C. for 10 hours. In the figure, "a" represents an S:Ru ratio of 6:1, "b" represents an S:Ru ratio of 4:1, "c" represents an S:Ru ratio of 4.8:1, "d" represents an S:Ru ratio of 4.3:1, and "e" represents an S:Ru ratio of 4:1. An organic matter in the product was eliminated via precalcination. An S:Ru ratio of 4.8:1 or smaller was found to be necessary, so as to significantly change behavior through S:Ru ratios and to cause crystallization via precalcination of a sample. When the S:Ru ratio was lowered to 4:1, crystallization was significantly advanced, and generation of an Ru metal also became observable.

Figure 26:
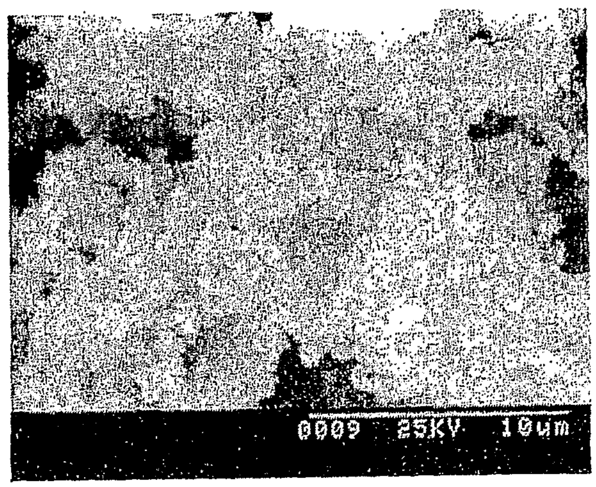
FIGS. 26A, 26B, and 26C each show a scanning electron micrograph of a resultant of precalcination, in an argon stream at 400° C. for 5 hours, of $RuS_2$ synthesized via a solvothermal reaction at 220° C. for 10 hours.
Figure 26:
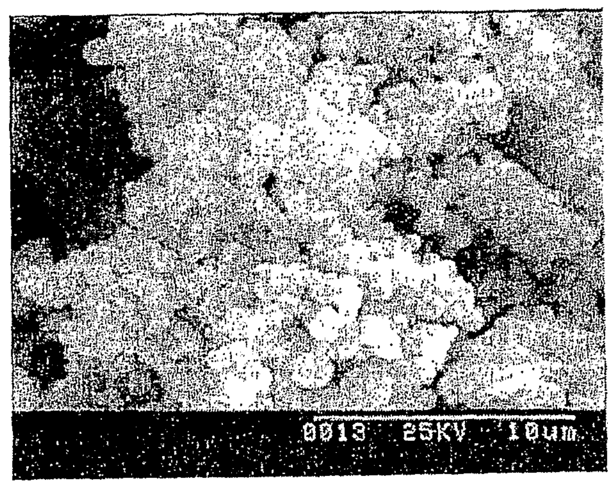
Figure 26:
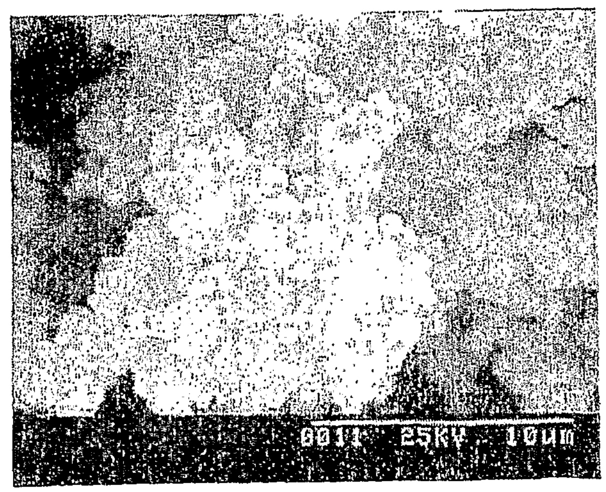
Figure 27:
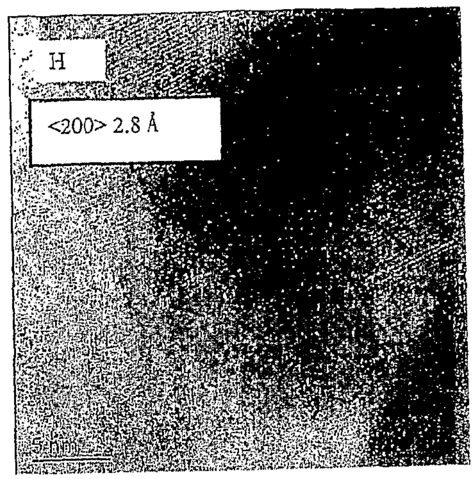
FIGS. 27A, 27B, 27C, and 27D each show a transmission electron micrograph of a resultant of precalcination of $RuS_2$.
Figure 27:
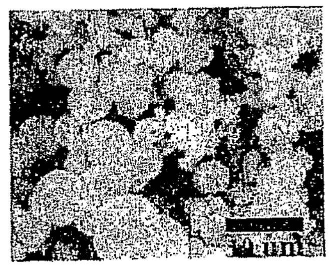
Figure 27:
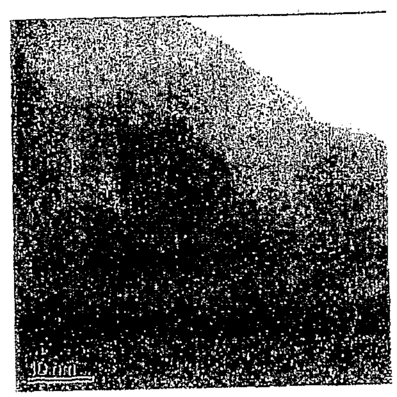
Figure 27:
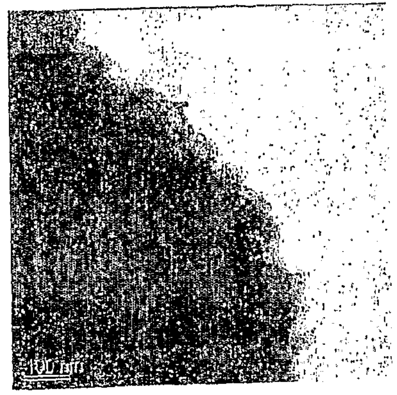

FIGS. 26A, 26B, and 26C each show a scanning electron micrograph of a resultant of precalcination, in an argon stream at 400° C. for 5 hours, of $RuS_2$ synthesized via a solvothermal reaction at 220° C. for 10 hours. In the figure, "a" represents an S:Ru ratio of 4:1, "b" represents an S:Ru ratio of 4.3:1, and "c" represents an S:Ru ratio of 6:1. Spherical particles of about 1 μm were aggregated, and the S:Ru ratio did not significantly influence powder or particle configurations. Transmission electron micrographs of a resultant of precalcination of $RuS_2$ shown in FIGS. 27A, 27B, 27C, and 27D demonstrate that precalcined spherical particles were fine particles and that each particle exhibits a lattice image, indicating satisfactory crystallization.

Figure 28:
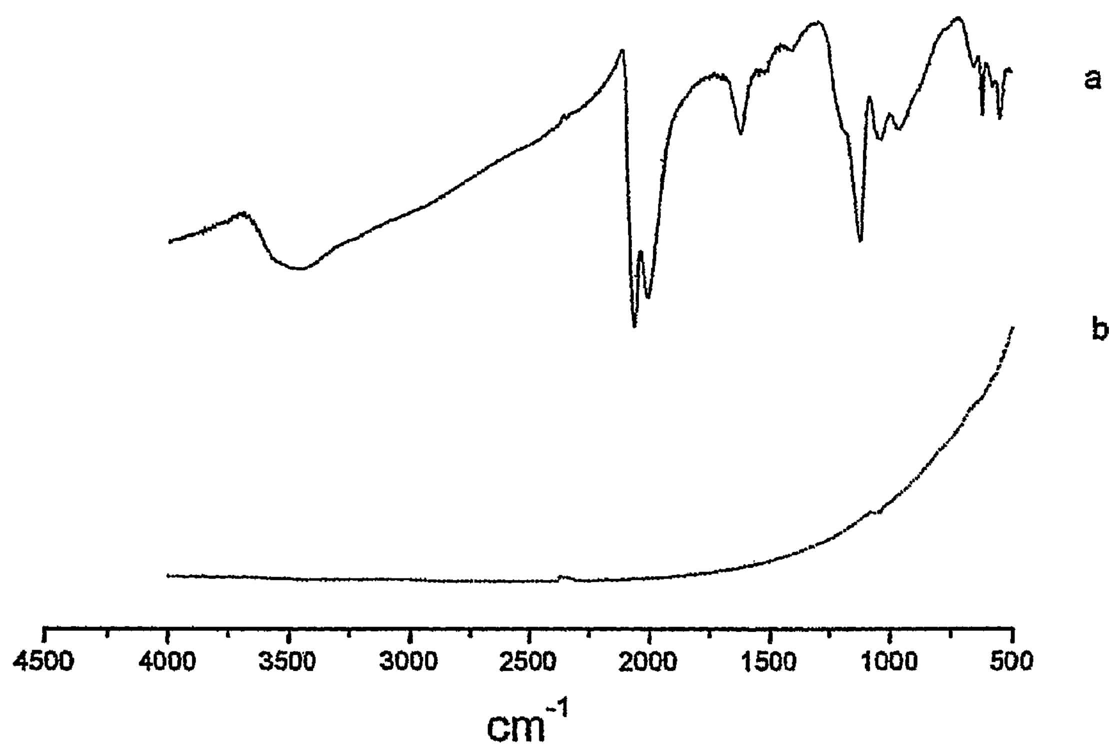
FIG. 28 shows the FTIR spectra of $RuS_2$ synthesized via a solvothermal reaction (an S:Ru ratio of 4:1) and that of a resultant of precalcination thereof at 400° C.

FIG. 28 shows the FTIR spectra of $RuS_2$ synthesized via a solvothermal reaction (with an S:Ru ratio of 4:1) and that of a resultant of precalcination thereof at 400° C. In the figure, "a" represents a product of hydrothermal synthesis and "b" represents a resultant of precalcination thereof.

2.2: Synthesis of $RuS_2$ Via Hydrothermal Reaction

Figure 29:
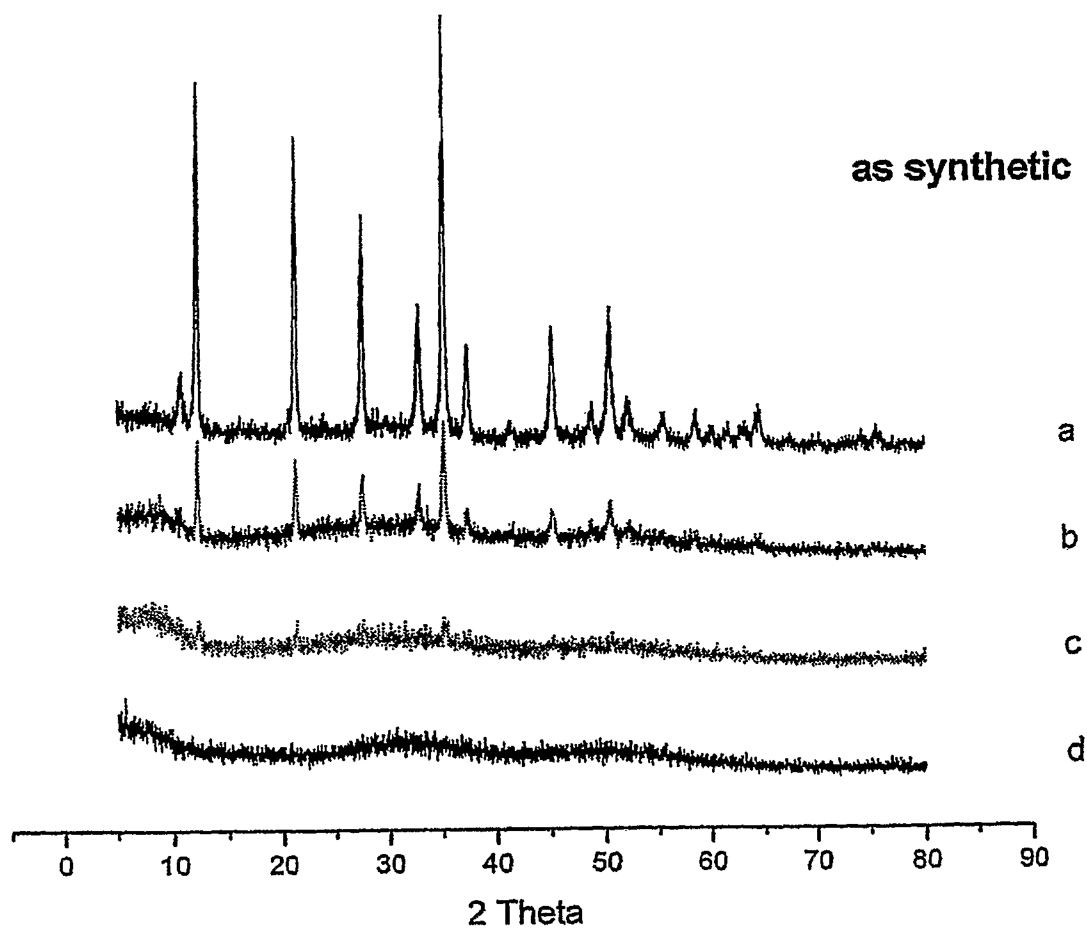
FIG. 29 shows an XRD pattern of $RuS_2$ synthesized via a hydrothermal reaction at 220° C. for 10 hours.
Figure 30:
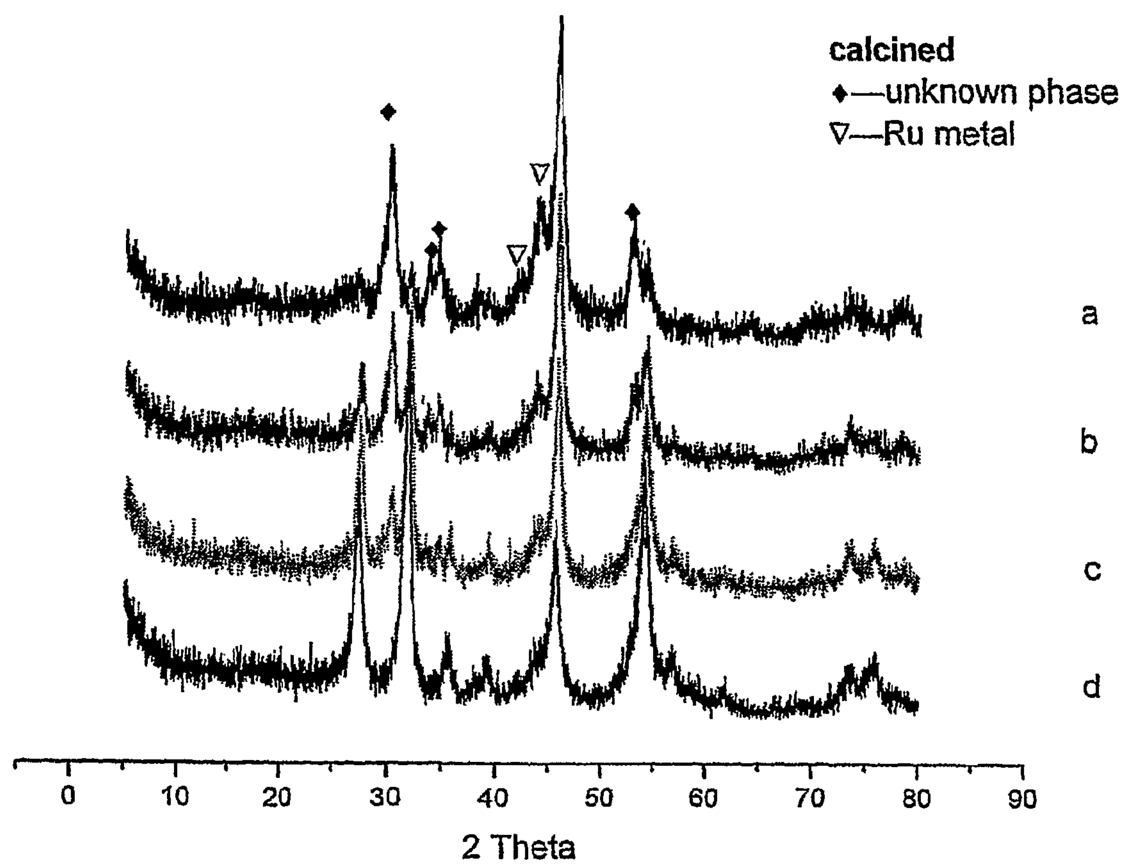
FIG. 30 shows an XRD pattern of a resultant of precalcination, at 400° C. for 5 hours, of $RuS_2$ synthesized via a hydrothermal reaction at 220° C. for 10 hours.
Figure 31:
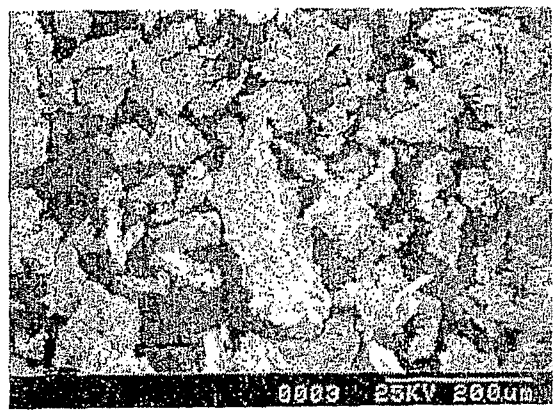
FIGS. 31A and 31B each show a scanning electron micrograph of $RuS_2$ and that of a resultant of precalcination thereof.

FIG. 29 shows an XRD pattern of $RuS_2$ synthesized via a hydrothermal reaction at 220° C. for 10 hours. FIG. 30 shows an XRD pattern of a resultant of precalcination, at 400° C. for 5 hours, of $RuS_2$ synthesized via a hydrothermal reaction at 220° C. for 10 hours. In the figure, "a" represents an S:Ru ratio of 2:1, "b" represents an S:Ru ratio of 2.8:1, "c" represents an S:Ru ratio of 3.6:1, and "d" represents an S:Ru ratio of 4.4:1. Further, FIGS. 31A and 31B each show a scanning electron micrograph of $RuS_2$ and that of a resultant of precalcination thereof. FIG. 31A shows a product, $RuS_2$, attained at an S:Ru ratio of 4.4:1, and FIG. 31B shows a resultant of precalcination thereof at 400° C. for 5 hours.

At an S:Ru ratio of 3.6:1 or lower, a crystal phase was generated in the resulting product, although a phase could not be identified. This phase is considered to contain organic matter. The non-crystalline phase attained at an S:Ru ratio of 4.4:1 became crystallized into $RuS_2$ via precalcination. At an S:Ru ratio of 2.8:1 or lower, an unidentified phase was observed in a resultant of precalcination. At an S:Ru ratio of 2.0:1, generation of an Ru metal was observed.

Example 3

Synthesis of $Rh_2S_3$ $Rh_6(CO)_{16}$ was used as a starting material for Rh, S (solid sulfur) was used as a starting material for S, and xylene or distilled water was used as a solvent to conduct a solvothermal or hydrothermal reaction at 220° C. for 10 hours. Thereafter, precalcination was carried out in an Ar atmosphere at 400° C. for 5 hours (partially at 750° C.).

3.1: Synthesis of $Rh_2S_3$ Via Solvothermal Reaction

Figure 32:
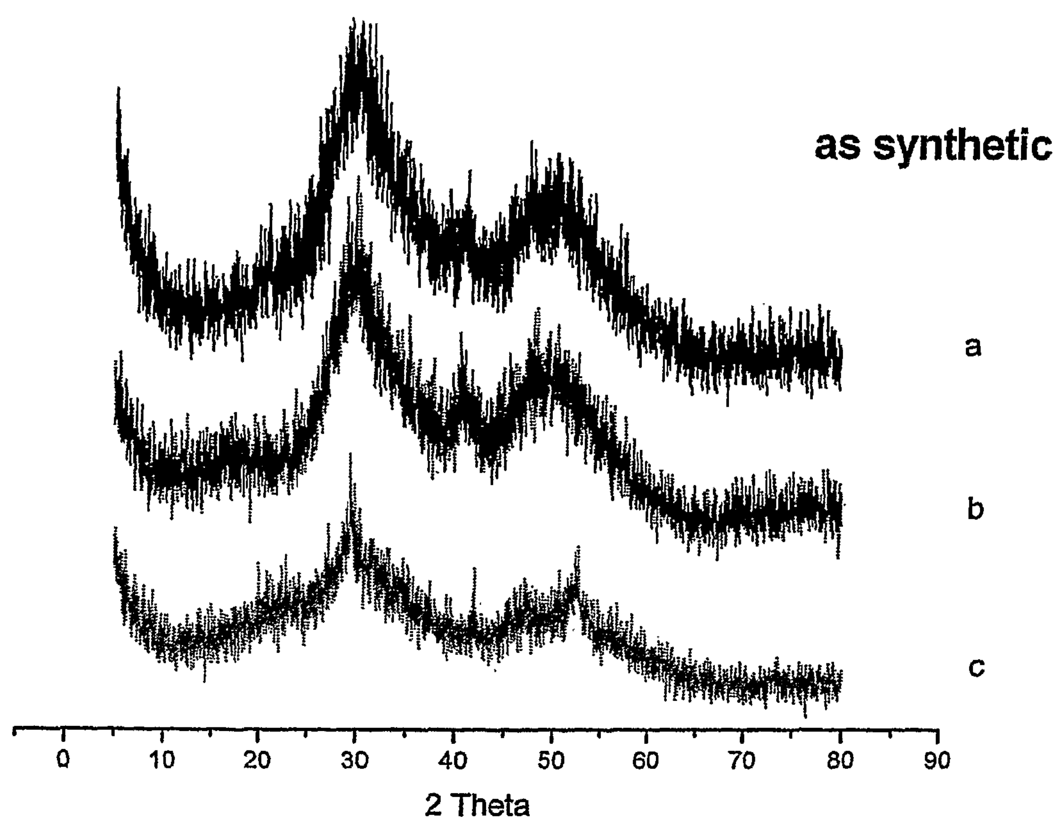
FIG. 32 shows an XRD pattern of $Rh_2S_3$ synthesized via a solvothermal reaction at 220° C. for 10 hours.
Figure 33:
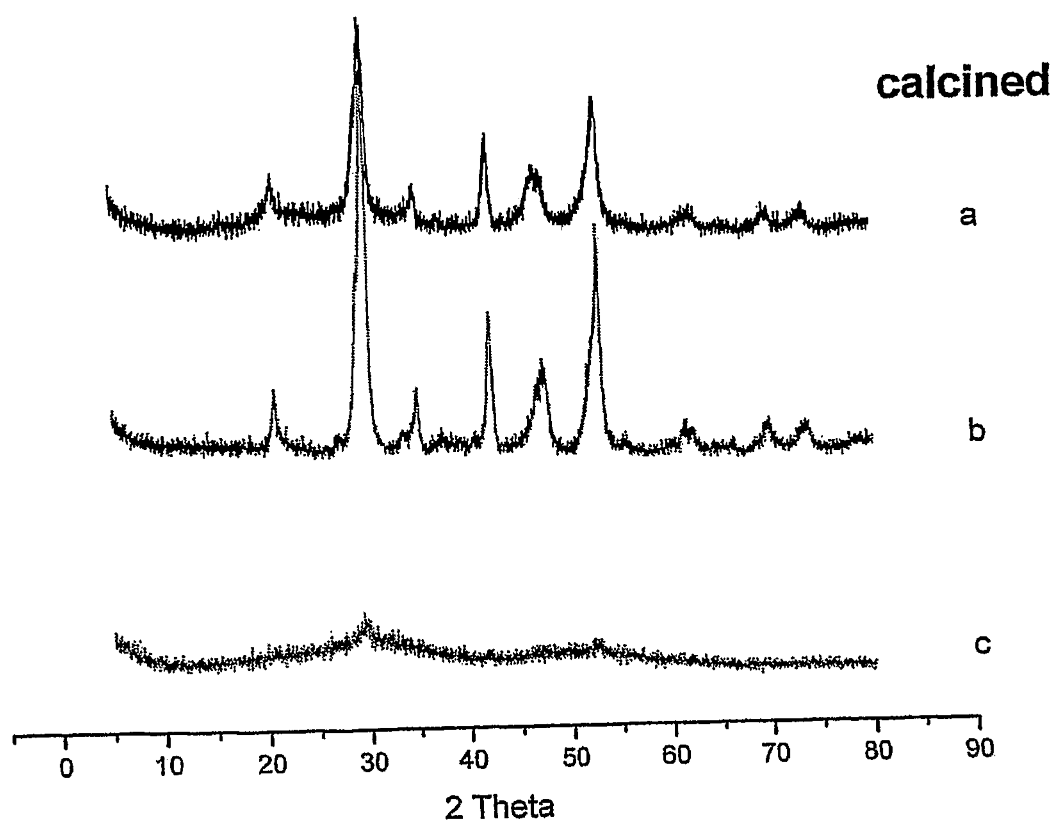
FIG. 33 shows an XRD pattern of a resultant of precalcination, in an argon stream at 400° C. for 5 hours, of $Rh_2S_3$ synthesized via a solvothermal reaction at 220° C. for 10 hours.
Figure 34:
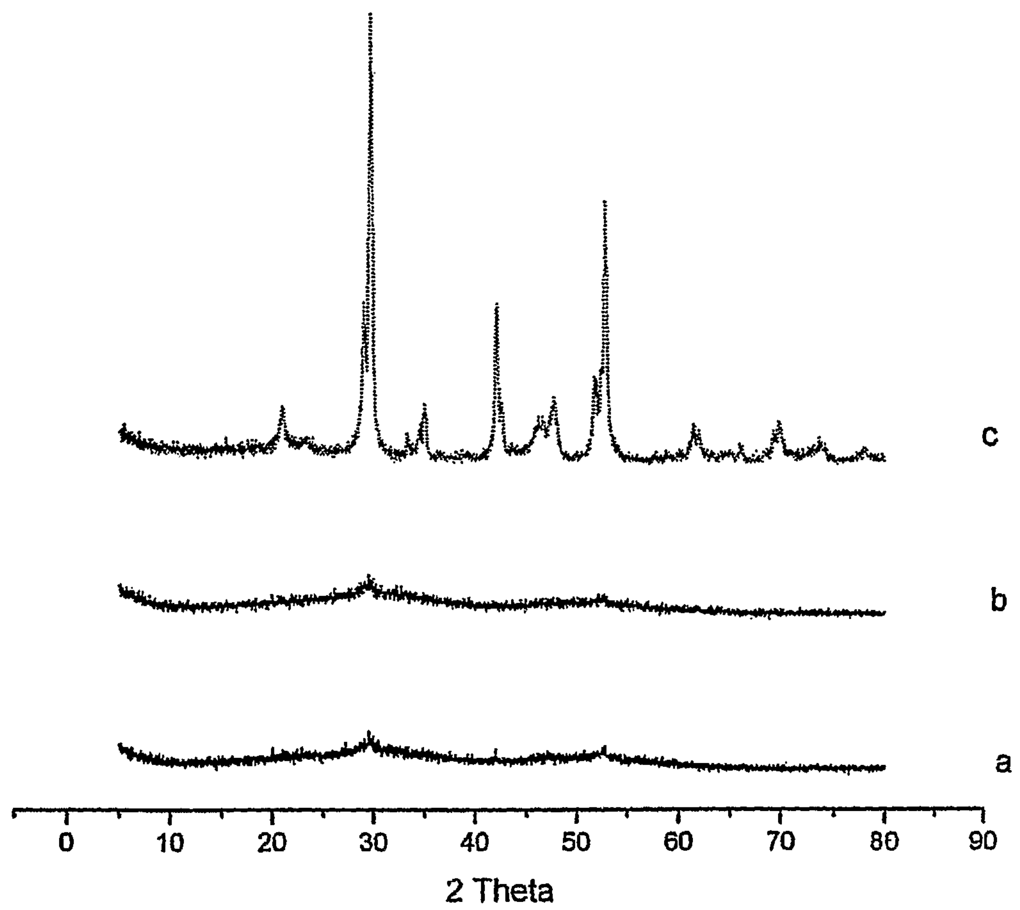
FIG. 34 shows an XRD pattern of $Rh_2S_3$ synthesized via a solvothermal reaction at 220° C. for 10 hours at an S:Rh ratio of 5.0:1 and that of a resultant of precalcination thereof in an argon stream at 400° C. for 5 hours and at 750° C. for 5 hours.
Figure 35:
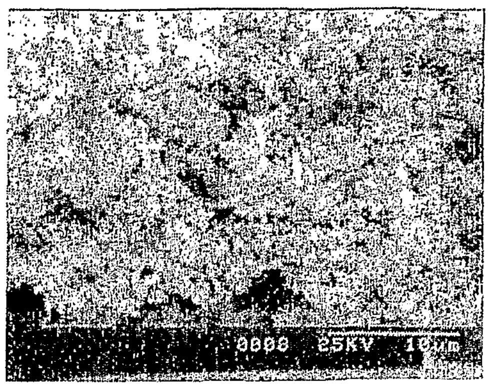
FIGS. 35A, 35B, 35C, and 35D each show a scanning electron micrograph of $Rh_2S_3$ resulting from a solvothermal reaction and a resultant of precalcination thereof.
Figure 35:
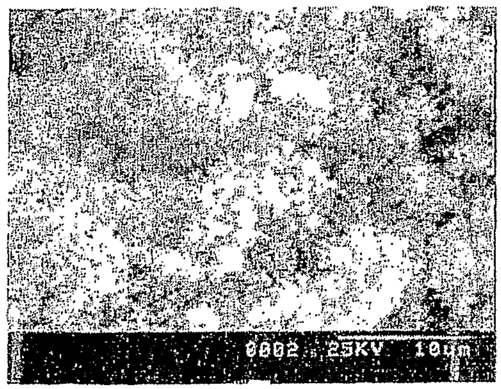
Figure 35:
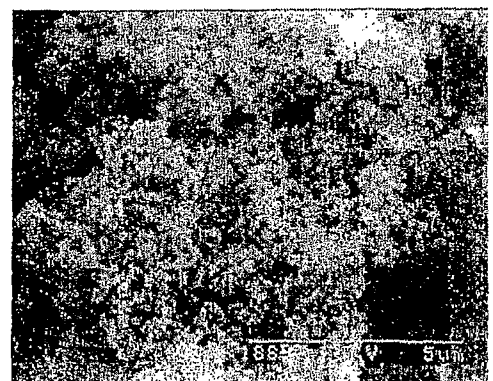
Figure 35:
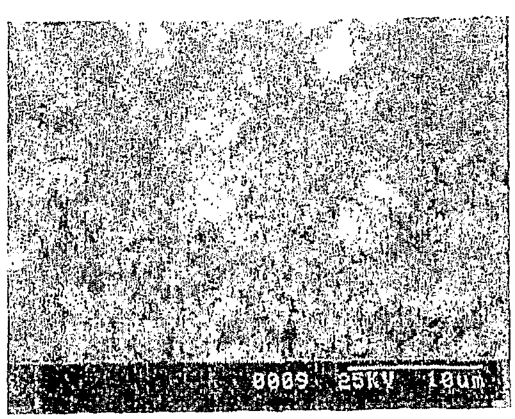

FIG. 32 shows an XRD pattern of $Rh_2S_3$ synthesized via a solvothermal reaction at 220° C. for 10 hours. FIG. 33 shows an XRD pattern of a resultant of precalcination, in an argon stream at 400° C. for 5 hours, of $Rh_2S_3$ synthesized via a solvothermal reaction at 220° C. for 10 hours. In the figure, "a" represents an S:Rh ratio of 1.5:1, "b" represents an S:Rh ratio of 3.6:1, and "c" represents an S:Rh ratio of 5.0:1. FIG. 34 shows an XRD pattern of $Rh_2S_3$ synthesized via a solvothermal reaction at 220° C. for 10 hours at an S:Rh ratio of 5.0:1 and that of a resultant of precalcination thereof in an Ar stream at 400° C. for 5 hours and at 750° C. for 5 hours. In the figure, "a" represents a product, $Rh_2S_3$, of a solvothermal reaction, "b" represents a resultant of precalcination thereof in an Ar stream at 400° C. for 5 hours, and "c" represents a resultant of precalcination thereof in an Ar stream at 750° C. for 5 hours.

A product of a solvothermal reaction, $Rh_2S_3$, exhibited low crystallinity; however, crystallization was remarkably advanced via precalcination thereof. Crystallization resulting from precalcination is influenced by the S:Rh ratio. At an S:Rh ratio of 3.6:1 or lower, crystallization occurred; however, crystallization did not occur at an S:Rh ratio of 5.0:1. By raising a precalcination temperature to 750° C., the sample became crystallized at an S:Rh ratio of 5:1.

FIGS. 35A, 35B, 35C, and 35D each show a scanning electron micrograph of $Rh_2S_3$ resulting from a solvothermal reaction and a resultant of precalcination thereof. In the figures, "a" represents a product of a solvothermal reaction attained at an S:Rh ratio of 3.6:1, "b" represents a resultant of calcination thereof at 400° C., "c" represents a product of a solvothermal reaction attained at an S:Rh ratio of 5.0:1, and "d" represents a resultant of calcination thereof at 400° C. The products were composed of very fine particles, regardless of an S:Rh ratio, and no change was observed via precalcination.

3.2: Synthesis of $Rh_2S_3$ Via Hydrothermal Reaction

Figure 36:
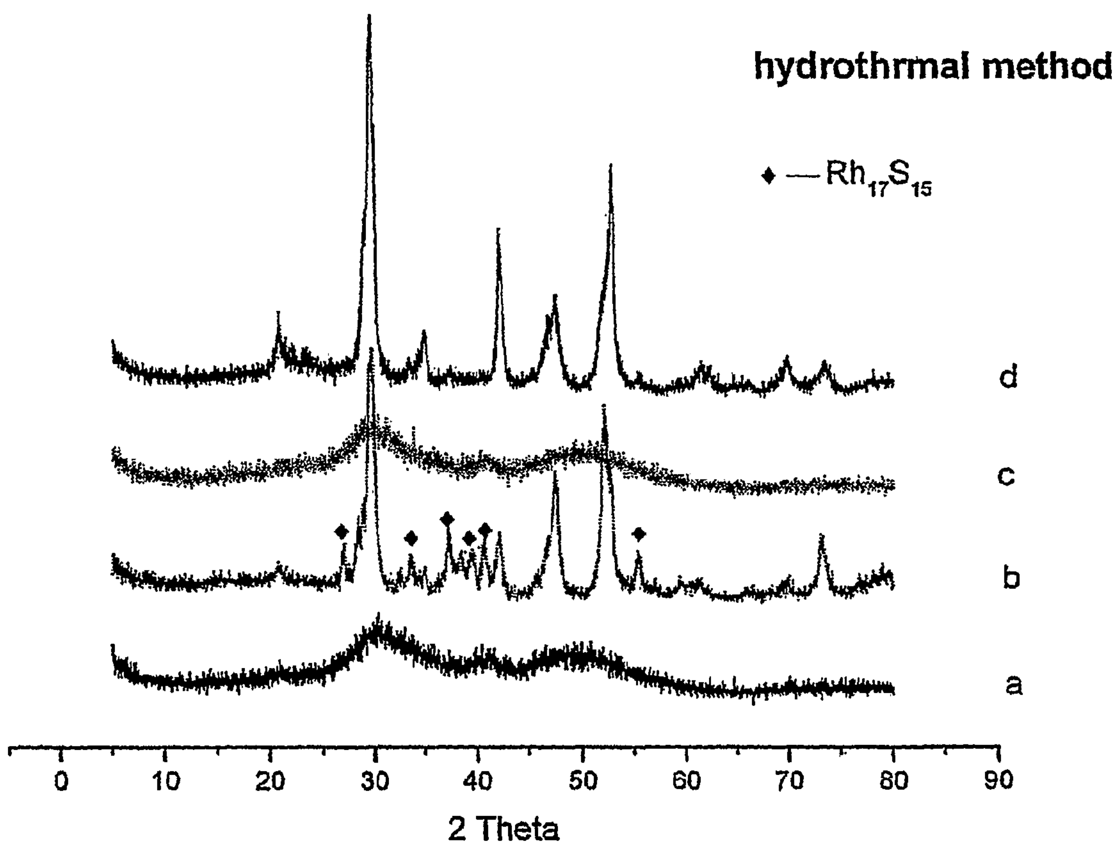
FIG. 36 shows an XRD pattern of $Rh_2S_3$ resulting from a hydrothermal reaction and that of a resultant of precalcination thereof.

FIG. 36 shows an XRD pattern of $Rh_2S_3$ resulting from a hydrothermal reaction and that of a resultant of precalcination thereof. In the figure, "a" represents a product of a hydrothermal reaction attained at an S:Rh ratio of 1.5:1, "b" represents a resultant of calcination thereof at 400° C., "c" represents a product of a hydrothermal reaction attained at an S:Rh ratio of 3.0:1, and "d" represents a resultant of calcination thereof at 400° C.

A product of a hydrothermal reaction, $Rh_2S_3$, exhibited low crystallinity, regardless of an S:Rh ratio; however, crystallization was remarkably advanced via precalcination. At an S:Rh ratio of 1.5:1, a resultant of precalcination contained impurities, and a phase of interest was more likely to be obtained at an S:Rh ratio of 3.0:1.

Figure 37:
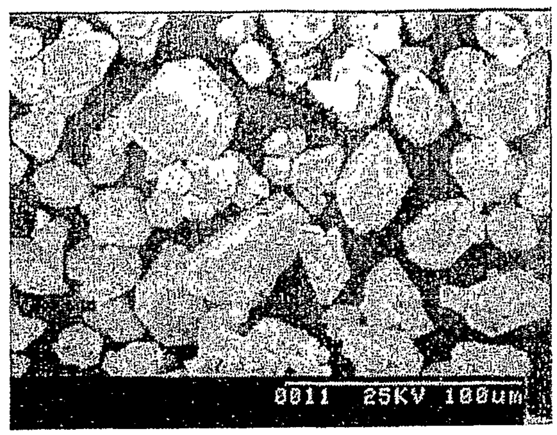
FIGS. 37A and 37B each show an electron micrograph of $Rh_2S_3$ resulting from a hydrothermal reaction and that of a resultant of precalcination thereof.
Figure 37:
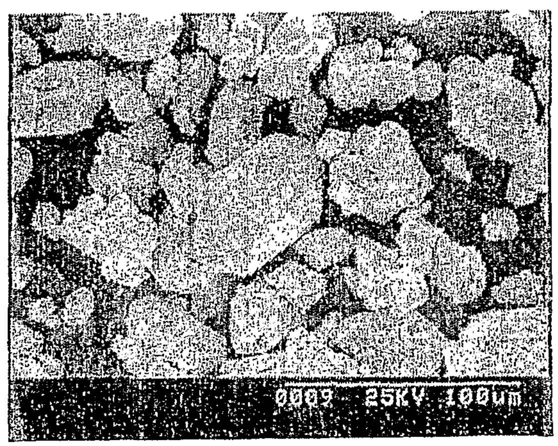

FIGS. 37A and 37B each show an electron micrograph of $Rh_2S_3$ resulting from a hydrothermal reaction and that of a resultant of precalcination thereof. In the figures, "a" represents a resultant of calcination (at 400° C.) of a product of a hydrothermal reaction at an S:Rh ratio of 1.5:1, and "b" represents a resultant of calcination (at 400° C.) of a product of a hydrothermal reaction at an S:Rh ratio of 3.0:1. A product of a hydrothermal reaction was partially idiomorphic and grown to a larger crystal. While the XRD pattern exhibits noncrystalline properties, the crystal assuredly grew, which is an inexplicable phenomenon.

Figure 38:
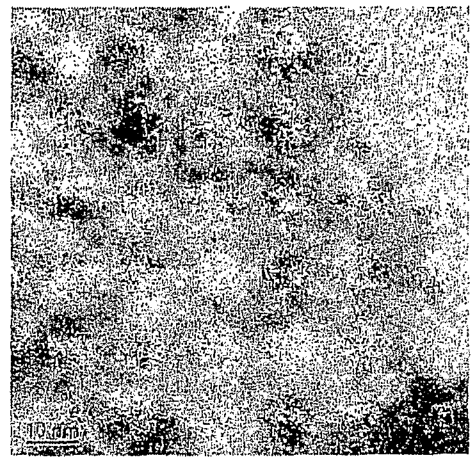
FIGS. 38A and 38B each show an electron micrograph and an electron diffraction diagram of $Rh_2S_3$ resulting from a hydrothermal reaction (an S:Rh ratio of 3.0:1).
Figure 38:
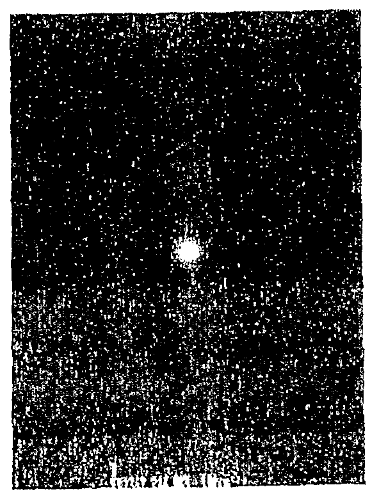
Figure 39:
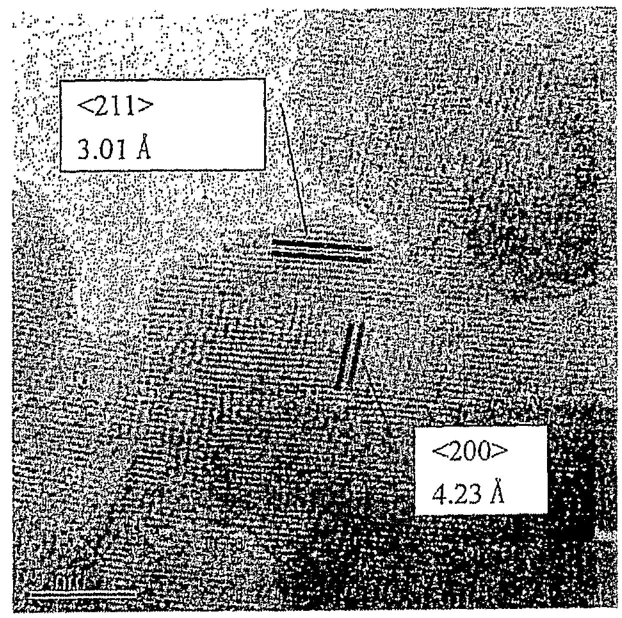
FIGS. 39A and 39B each show an electron micrograph and an electron diffraction diagram of a resultant of calcination of $Rh_2S_3$ resulting from a hydrothermal reaction at 400° C. (an S:Rh ratio of 3.0:1).
Figure 39:
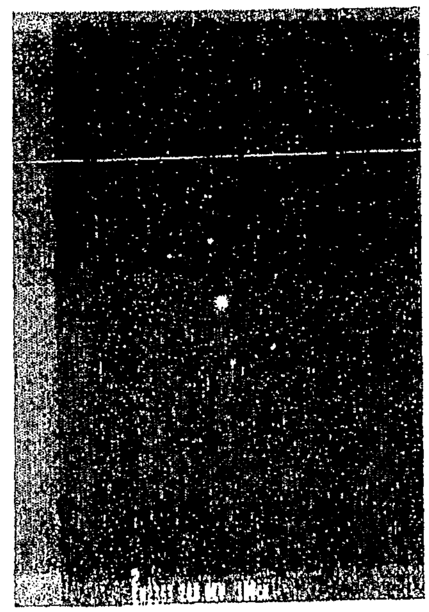

FIGS. 38A and 38B each show an electron micrograph and an electron diffraction diagram of $Rh_2S_3$ resulting from a hydrothermal reaction at an S:Rh ratio of 3.0:1. FIGS. 39A and 39B each show an electron micrograph and an electron diffraction diagram of a resultant of calcination at 400° C. of $Rh_2S_3$ resulting from a hydrothermal reaction at an S:Rh ratio of 3.0:1. Growth of crystals described above was verified by the transmission electron micrograph or the electron diffraction diagram shown in FIGS. 38A, 38B, 39A, and 39B.

Figure 40:
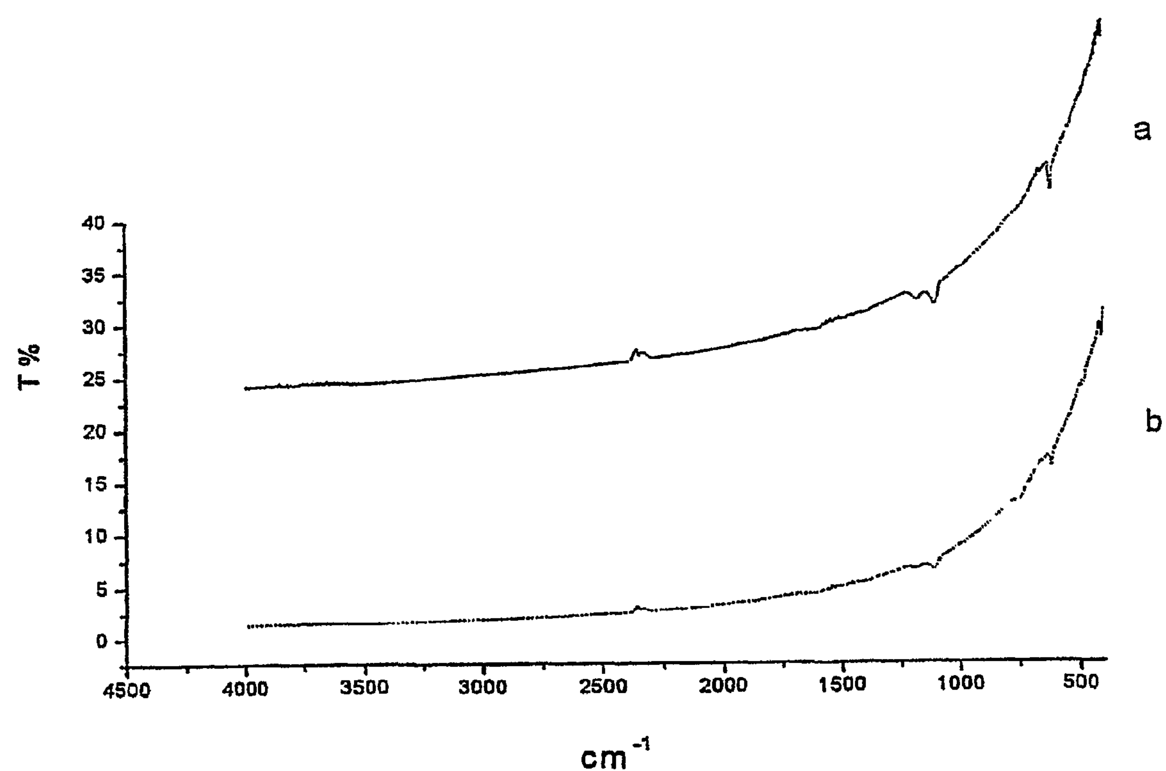
FIG. 40 shows the FTIR spectra of hydrothermally synthesized $Rh_2S_3$ (an S:Rh ratio of 3:1) and a resultant of precalcination thereof at 400° C.

FIG. 40 shows the FTIR spectra of hydrothermally synthesized $Rh_2S_3$ (with an S:Rh ratio of 3:1) and a resultant of precalcination thereof at 400° C. In the figure, "a" represents a product of hydrothermal synthesis, and "b" represents a resultant of precalcination thereof. The IR spectra shown in FIG. 40 demonstrate that the product of a hydrothermal reaction did not contain any organic matter.

Example 4

Synthesis of $ReS_2$ $Re_2(CO)_{10}$ was used as a starting material for Re, S (solid sulfur) was used as a starting material for S, and xylene or distilled water was used as a solvent to conduct a solvothermal or hydrothermal reaction at 220° C. for 10 hours. Thereafter, precalcination was carried out in an Ar atmosphere at 400° C. or 750° C. for 5 hours.

4.1: Synthesis of $ReS_2$ Via Solvothermal Reaction

Figure 41:
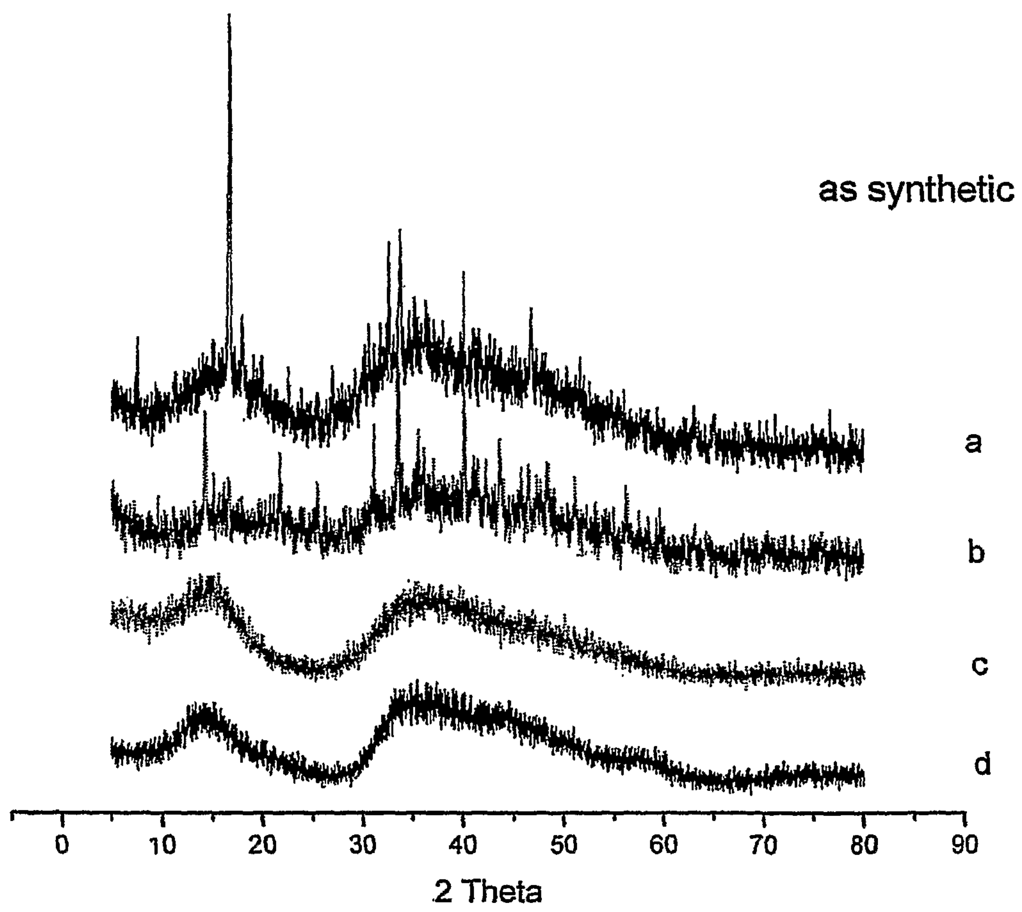
FIG. 41 shows an XRD pattern of $ReS_2$ synthesized via a solvothermal reaction at 220° C. for 10 hours.
Figure 42:
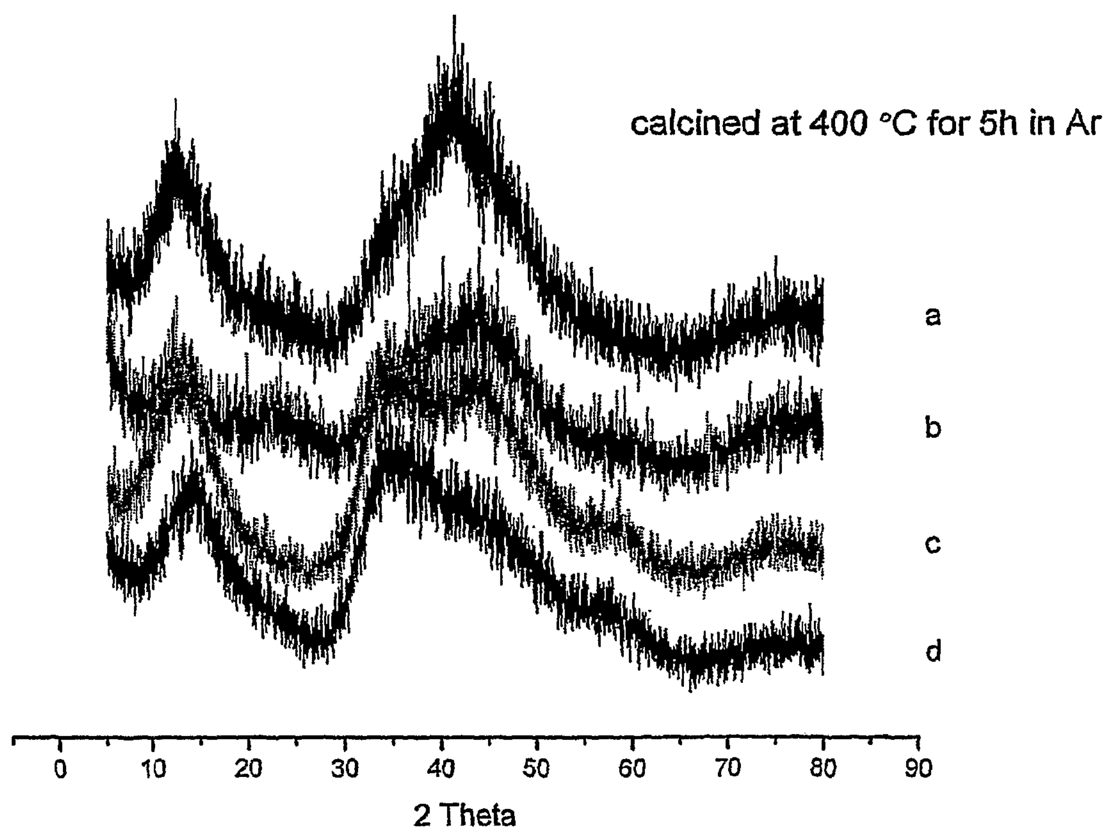
FIG. 42 shows an XRD pattern of a resultant of precalcination, in an argon stream at 400° C. for 5 hours, of $ReS_2$ synthesized via a solvothermal reaction at 220° C. for 10 hours.

FIG. 41 shows an XRD pattern of $ReS_2$ synthesized via a solvothermal reaction at 220° C. for 10 hours. FIG. 42 shows an XRD pattern of a resultant of precalcination in an Ar stream at 400° C. for 5 hours of $ReS_2$ synthesized via a solvothermal reaction at 220° C. for 10 hours. In the figures, "a" represents an S:Re ratio of 1.32:1, "b" represents an S:Re ratio of 2:1, "c" represents an S:Re ratio of 4:1, and "d" represents an S:Re ratio of 9:1.

When an S:Re ratio is lower than 2:1, a very sharp diffraction line was observed in addition to a broad diffraction line obtained from a low-crystalline substance, although this sharp line could not be identified. Since this diffraction line disappears upon precalcination, this line is considered to be derived from organic matter. When a sample was precalcined at 400° C. and an S:Re ratio was lower than 2:1, a diffraction line at around 40° C. was not separated at all, and the behavior was different from that of a sample with a higher S:Re ratio.

Figure 43:
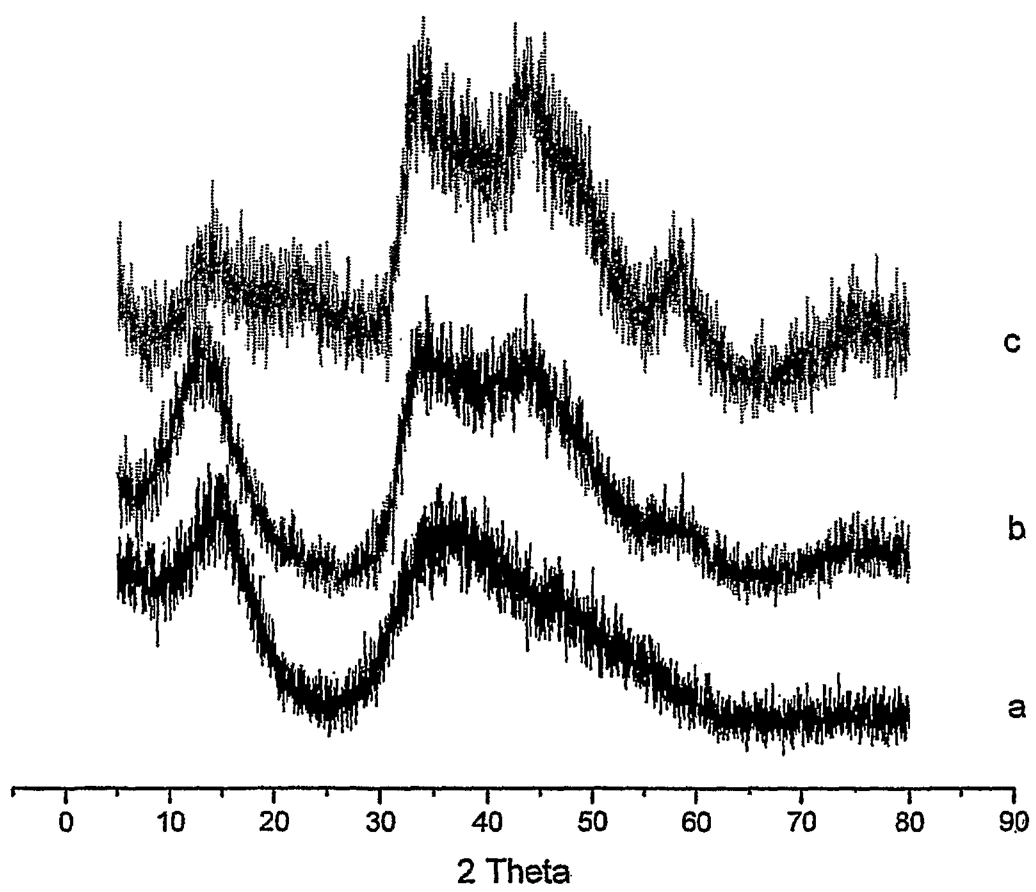
FIG. 43 shows an XRD pattern of $ReS_2$ obtained at an S:Re ratio of 4:1 and that of a resultant of precalcination thereof.
Figure 44:
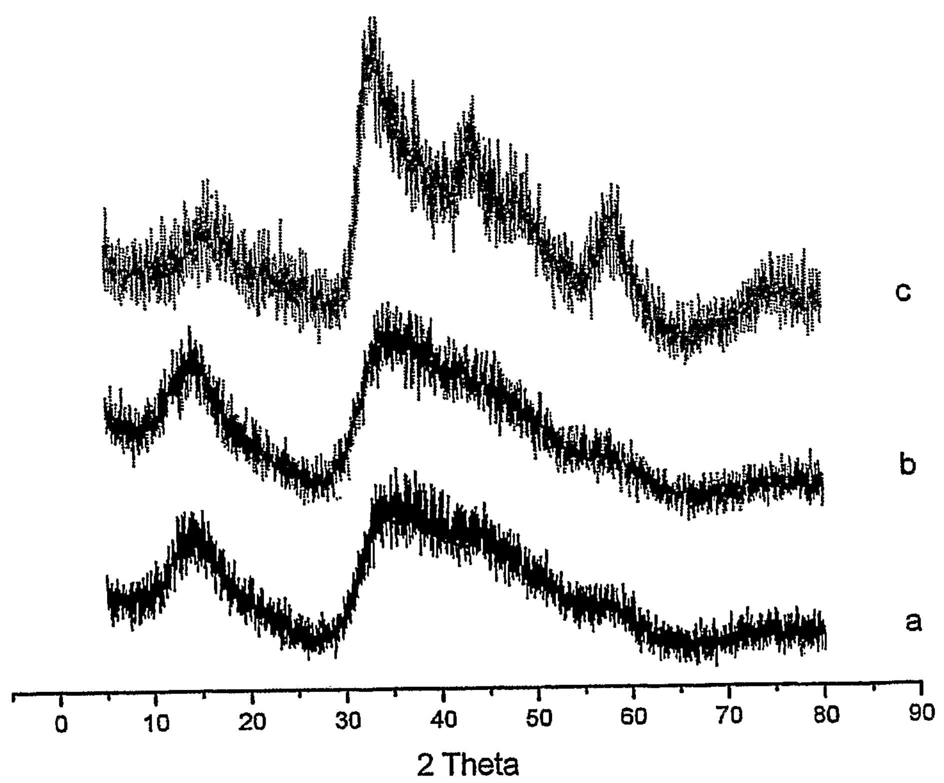
FIG. 44 shows an XRD pattern of $ReS_2$ obtained at an S:Re ratio of 9:1 and that of a resultant of precalcination thereof.
Figure 45:
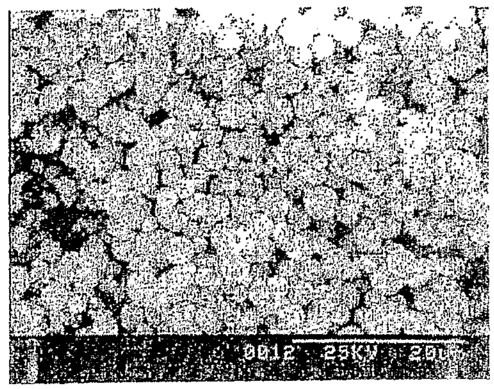
FIGS. 45A, 45B, 45C, and 45D each show a scanning electron micrograph of $ReS_2$ resulting from a solvothermal reaction and that of a resultant of precalcination thereof.
Figure 45:
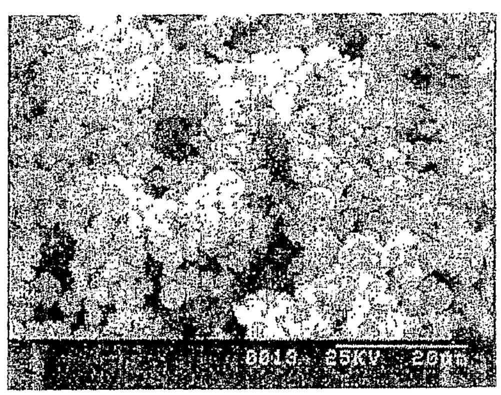
Figure 45:
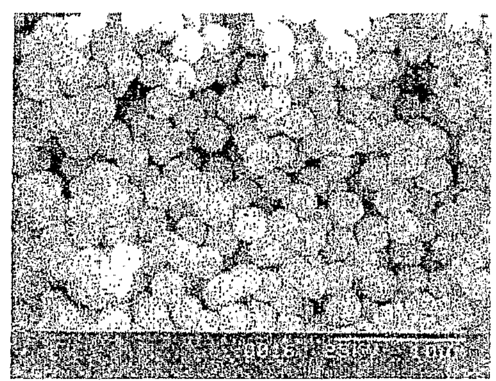
Figure 45:
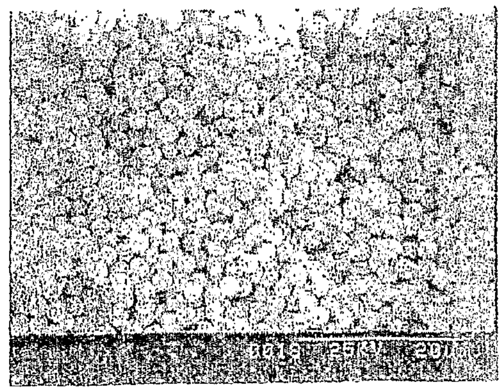

FIG. 43 shows an XRD pattern of $ReS_2$ obtained at an S:Re ratio of 4:1 and that of a resultant of precalcination thereof. In the figure, "a" represents a product, $ReS_2$, of a solvothermal reaction, "b" represents a resultant of precalcination thereof at 400° C., and "c" represents a resultant of precalcination thereof at 750° C. FIG. 44 shows an XRD pattern of $ReS_2$ obtained at an S:Re ratio of 9:1 and that of a resultant of precalcination thereof. In the figure, "a" represents a product, $ReS_2$, of a solvothermal reaction, "b" represents a resultant of precalcination thereof at 400° C., and "c" represents a resultant of precalcination thereof at 750° C. Crystallinity is enhanced via calcination at 750° C.; however, a diffraction line remains broad and the sample is not considered to be completely crystallized.

FIGS. 45A, 45B, 45C, and 45D each show a scanning electron micrograph of $ReS_2$ resulting from a solvothermal reaction and that of a resultant of precalcination thereof. In the figures, "a" represents a product of a solvothermal reaction at an S:Re ratio of 4:1, "b" represents a resultant of precalcination thereof at 400° C., "c" represents a product of a solvothermal reaction at an S:Re ratio of 2:1, and "d" represents a resultant of precalcination thereof at 400° C. The resultant was composed of spherical particles. When an S:Re ratio was 2:1, in particular, the size was homogeneous. When an S:Re ratio was 4:1, however, the particle diameter distribution became broadened.

Figure 46:
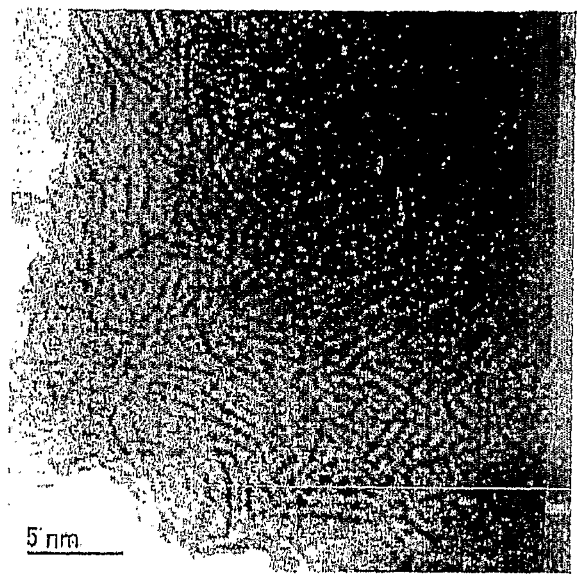
FIGS. 46A and 46B each show an electron micrograph and an electron diffraction diagram of $ReS_2$ resulting from a solvothermal reaction at an S:Rh ratio of 9.0:1 and those of a resultant of calcination thereof at 750° C.
Figure 46:
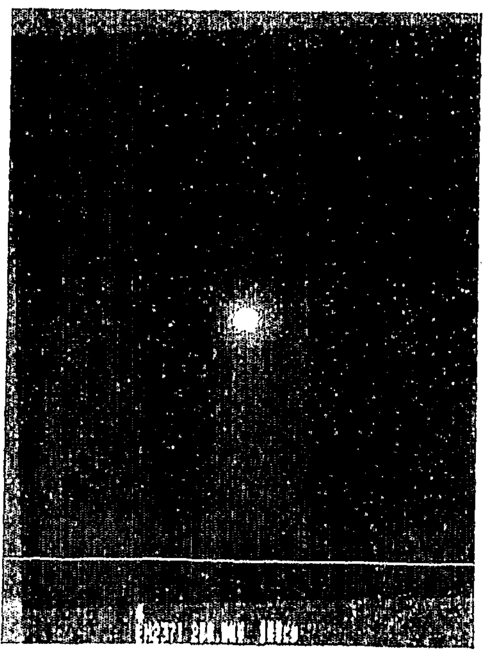

FIGS. 46A and 46B each show an electron micrograph and an electron diffraction diagram of $ReS_2$ resulting from a solvothermal reaction at an S:Rh ratio of 9.0:1 and those of a resultant of calcination thereof at 750° C.

Figure 47:
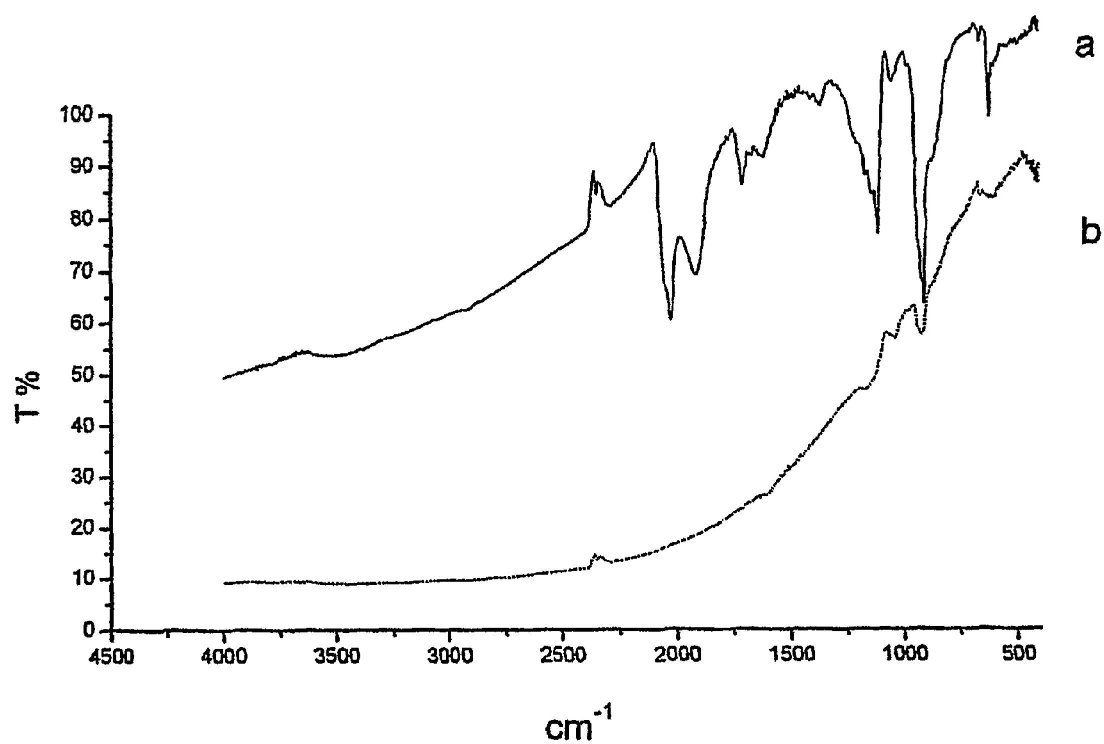
FIG. 47 shows the FTIR spectra of a solvothermal product (an S:Rh ratio of 4:1) and a resultant of precalcination thereof at 400° C.

FIG. 47 shows the FTIR spectra of a solvothermal product (with an S:Rh ratio of 4:1) and a resultant of precalcination thereof at 400° C. In the figure, "a" represents a product of hydrothermal synthesis and "b" represents a resultant of precalcination thereof.

Table 1 shows the results of EDX analysis of resultants of precalcination at 750° C.

TABLE 1

| Area No. | S:Re |
|---|---|
| 1 | 2.39 |
| 2 | 1.80 |
| 3 | 1.21 |
| 4 | 2.19 |
| 5 | 1.71 |
| 6 | 1.26 |
| 7 | 2.19 |
| 8 | 2.22 |
| 9 | 1.99 |

As a result of EDX analysis of compositions, an S:Re ratio of 1.98:1 was attained as a mean, and variation in compositions was observed in the same spherical particle. Thus, an accurate composition ratio may not necessarily be attained.

4.2: Synthesis of $ReS_2$ Via Hydrothermal Reaction

Figure 48:
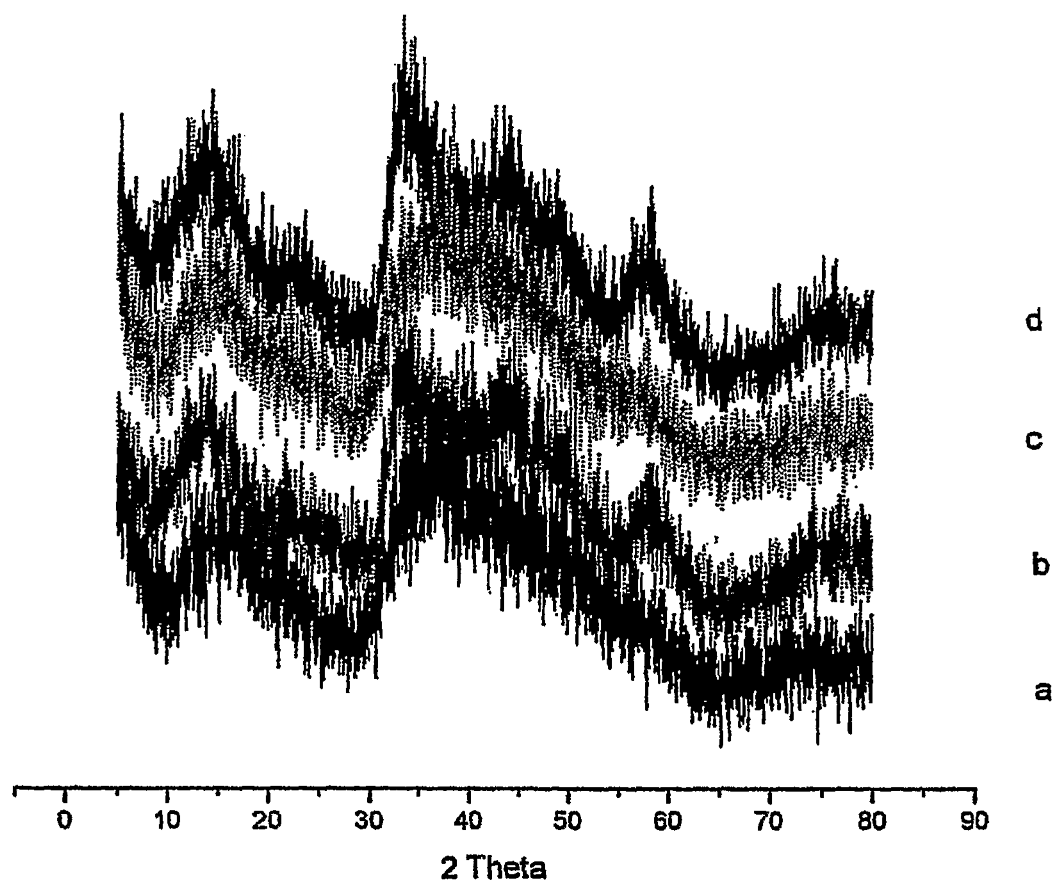
FIG. 48 shows an XRD pattern of $ReS_2$ synthesized via a hydrothermal reaction at 220° C. for 10 hours and that of a resultant of precalcination thereof in an argon stream at 400° C. for 5 hours.
Figure 49:
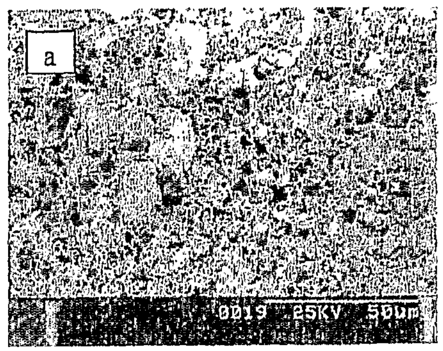
FIGS. 49A, 49B, 49C, and 49D each show a scanning electron micrograph of $ReS_2$ resulting from a hydrothermal reaction and a resultant of precalcination thereof.
Figure 49:
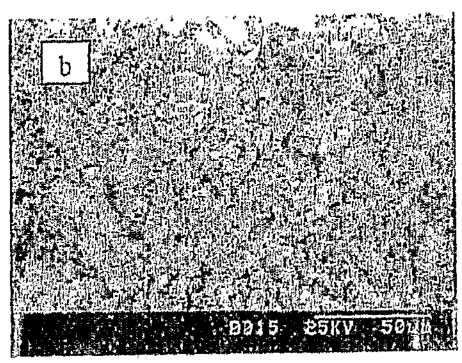
Figure 49:
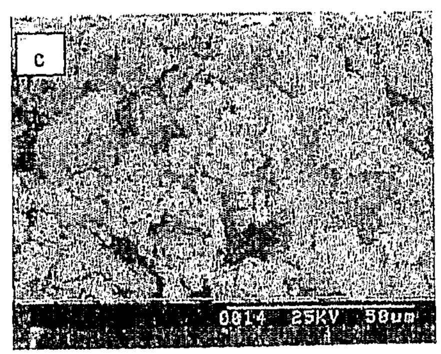

FIG. 48 shows an XRD pattern of $ReS_2$ synthesized via a hydrothermal reaction at 220° C. for 10 hours and that of a resultant of precalcination thereof in an Ar stream at 400° C. for 5 hours. In the figure, "a" represents an S:Re ratio of 2:1, "b" represents a resultant of precalcination thereof, "c" represents an S:Re ratio of 4:1, and "d" represents a resultant of precalcination thereof.

Even when an S:Re ratio was changed to 2:1 or 4:1 and the sample was precalcined at 400° C., crystallinity was somewhat improved, but the product remained low in crystallinity.

FIGS. 49A, 49B, 49C, and 49D each show a scanning electron micrograph of $ReS_2$ resulting from a hydrothermal reaction and a resultant of precalcination thereof. In the figures, "a" represents a product of a hydrothermal reaction at an S:Re ratio of 4:1, "b" represents a resultant of precalcination thereof at 400° C., "c" represents a product of a hydrothermal reaction at an S:Re ratio of 2:1, and "d" represents a resultant of precalcination thereof at 400° C. The product was firmly aggregated.

[Evaluation of Performance]

Figure 50:
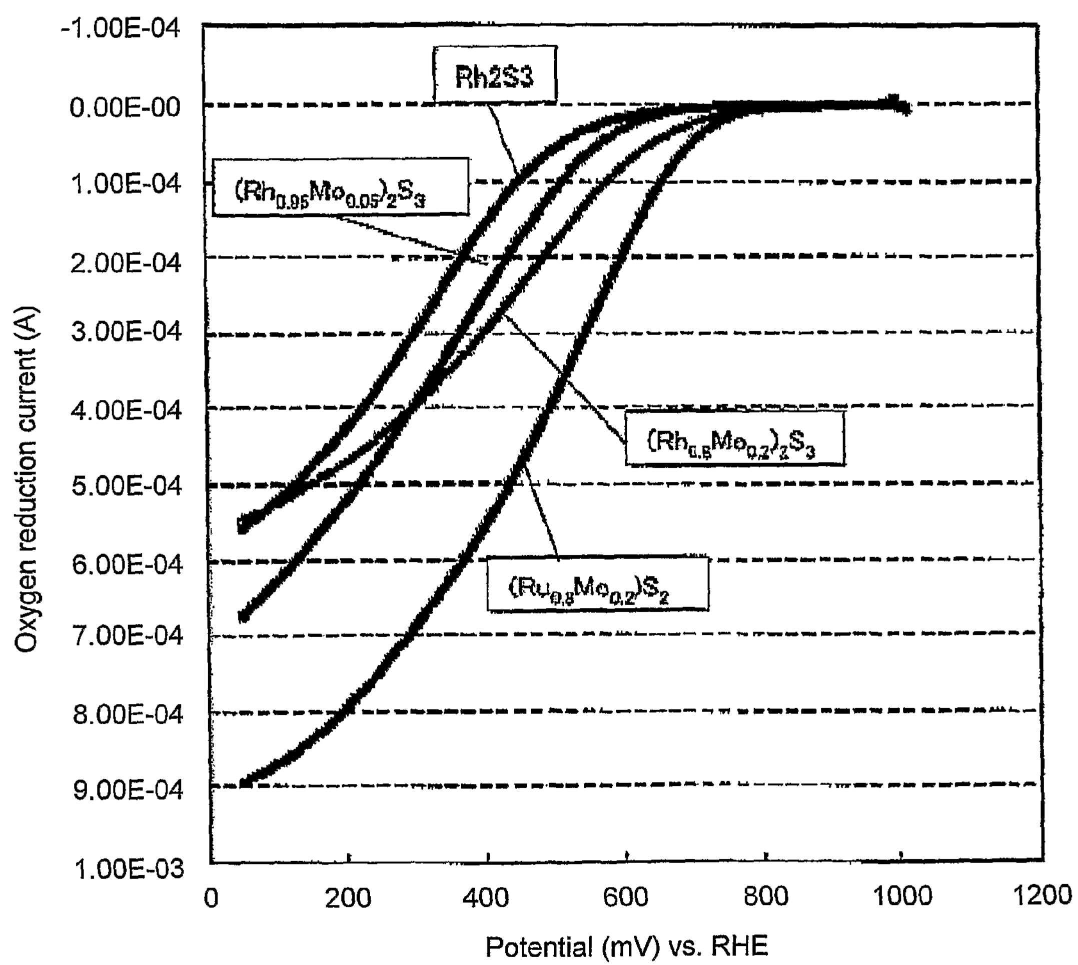
FIG. 50 shows the results of examining the performance of sulfides or sulfide complexes of the present invention as oxygen-reducing catalysts.

FIG. 50 shows the results of examining the performance of sulfides or sulfide complexes of the present invention as oxygen-reducing catalysts. The results shown in FIG. 50 indicate that the sulfides or sulfide complexes of the present invention have excellent capacity as catalysts for reducing oxygen.

INDUSTRIAL APPLICABILITY

The present invention can provide single-crystal fine powder of a sulfide or sulfide complex comprising at least one element selected from the group consisting of molybdenum (Mo), rhodium (Rh), ruthenium (Ru), and rhenium (Re). In particular, a fine spherical single crystal can be obtained. Such single-crystal fine powder of a sulfide or sulfide complex comprising a given element can be used for known applications. Further, development thereof can be expected in various applications by making use of its properties. For example, such substance can be used for a catalyst for a fuel cell that can be operated in a cost-effective manner. Further, adequate selection of a dopant element with which the powder is to be doped can lead to manifestation of various physical properties.

The invention claimed is:

1. A method for producing fine powder of a sulfide or sulfide complex comprising at least one element selected from the group consisting of molybdenum (Mo), rhodium (Rh), ruthenium (Ru), and rhenium (Re), comprising:

preparing a solvent mixture from at least one compound selected from among $Mo(CO)_6$, $Ru(CO)_{12}$, $Rh_6(CO)_{16}$, and $Re_2(CO)_{10}$; and sulfur (S); and subjecting the solvent mixture to a hydrothermal or solvothermal reaction at a pressure and temperature that converts the solvent mixture into a supercritical state in water or solvent or into a subcritical state in water or solvent, which is followed by a thermal treatment in an argon gas atmosphere at 300° C. to 800° C.

* * * * *